United States Patent
Helgee et al.

(10) Patent No.: US 7,295,272 B2
(45) Date of Patent: *Nov. 13, 2007

(54) LIQUID CRYSTAL DEVICE, A METHOD FOR PRODUCING A LIQUID CRYSTAL DEVICE AND METHOD FOR CONTROLLING A LIQUID CRYSTAL DEVICE

(75) Inventors: Bertil Helgee, Västra Frölunda (SE); Latchezar Komitov, Göteborg (SE)

(73) Assignee: Ecsibeo PPF1 AB, Gothenberg (SE)

( * ) Notice: Subject to any disclaimer, the term of this patent is extended or adjusted under 35 U.S.C. 154(b) by 162 days.

This patent is subject to a terminal disclaimer.

(21) Appl. No.: 10/508,205

(22) PCT Filed: Mar. 21, 2003

(86) PCT No.: PCT/SE03/00477

§ 371 (c)(1),
(2), (4) Date: Sep. 20, 2004

(87) PCT Pub. No.: WO03/081326

PCT Pub. Date: Oct. 2, 2003

(65) Prior Publication Data

US 2005/0146670 A1 Jul. 7, 2005

(30) Foreign Application Priority Data

Mar. 22, 2002 (SE) .................................. 0200910

(51) Int. Cl.
*G02F 1/1337* (2006.01)
*G02F 1/141* (2006.01)
*G02F 1/13* (2006.01)

(52) U.S. Cl. .................. 349/123; 349/135; 349/172
(58) Field of Classification Search .............. 349/172, 349/123, 129, 135

See application file for complete search history.

(56) References Cited

U.S. PATENT DOCUMENTS

| 4,813,767 A | 3/1989 | Clark et al. |
| 5,039,208 A | 8/1991 | Ohnishi et al. |
| 5,078,477 A | 1/1992 | Jono et al. |

(Continued)

FOREIGN PATENT DOCUMENTS

EP 0261721 3/1988

(Continued)

OTHER PUBLICATIONS

Ichimura et al., "Command Surfaces 14[1]. Photoregulation of in-plane Alignment of a Liquid Crystal by the Photoisomerization of Stilbenes Chemisorbed on a Substrate Silica Surface", *Liquid Crystals*, vol. 20, No. 2, pp. 161 to 169, 1996.

(Continued)

*Primary Examiner*—Toan Ton
(74) *Attorney, Agent, or Firm*—Buchanan Ingersoll & Rooney PC

(57) ABSTRACT

The invention relates to a liquid crystal device, comprising a liquid crystal bulk layer and chiral dopants being inhomogeneously distributed in the bulk layer as a result of being permanently attached to at least one surface, termed chiral surface. The invention also relates to methods for manufacturing as well as methods for controlling liquid crystal devices.

33 Claims, 12 Drawing Sheets

U.S. PATENT DOCUMENTS

| | | |
|---|---|---|
| 5,159,475 A | 10/1992 | Fergason et al. |
| 5,214,523 A | 5/1993 | Nito et al. |
| 5,239,398 A | 8/1993 | Yanagisawa et al. |
| 5,256,456 A | 10/1993 | Ogawa |
| 5,512,336 A | 4/1996 | Yamahara |
| 5,514,426 A | 5/1996 | Eguchi |
| 5,528,394 A | 6/1996 | Yeoh et al. |
| 5,532,854 A | 7/1996 | Fergason |
| 5,578,243 A | 11/1996 | Mazaki et al. |
| 5,608,556 A | 3/1997 | Koma |
| 5,612,803 A * | 3/1997 | Yamada et al. ............. 349/188 |
| 5,784,137 A | 7/1998 | Shiomi et al. |
| 6,010,641 A | 1/2000 | Sage et al. |
| 6,043,860 A | 3/2000 | Wei et al. |
| 6,046,789 A | 4/2000 | Fünfschilling et al. |
| 6,100,953 A | 8/2000 | Kim et al. |
| 6,219,019 B1 | 4/2001 | Hasegawa et al. |
| 6,266,115 B1 | 7/2001 | Fujikawa et al. |
| 6,297,865 B1 * | 10/2001 | Matsui et al. ............... 349/123 |
| 6,417,907 B2 | 7/2002 | Choi et al. |
| 6,549,255 B2 | 4/2003 | Stebler et al. |
| 6,556,260 B1 * | 4/2003 | Itou et al. .................... 349/69 |
| 6,570,637 B2 | 5/2003 | Choi et al. |
| 6,876,425 B2 | 4/2005 | Yoo et al. |
| 2001/0006407 A1 | 7/2001 | Choi et al. |
| 2002/0006480 A1 | 1/2002 | Hisamitsu et al. |

FOREIGN PATENT DOCUMENTS

| | | |
|---|---|---|
| GB | 2326245 | 12/1998 |
| JP | 10-096926 | 4/1998 |
| JP | 10-133213 | 5/1998 |
| KR | P1998-014982 | 5/1998 |
| WO | 8909203 | 10/1989 |
| WO | WO 96/31876 | 10/1996 |
| WO | WO 00/03288 | 1/2000 |
| WO | WO 00/29505 | 5/2000 |
| WO | WO 01/23953 | 4/2001 |

OTHER PUBLICATIONS

Galli et al., "The Mesophase Structure of Chiral Liquid Crystalline Polysiloxanes for Electro-Optical Applications", *Mol. Cryst. and Liq. Cryst.*, vol. 360, pp. 147 to 160, 2001.

* cited by examiner

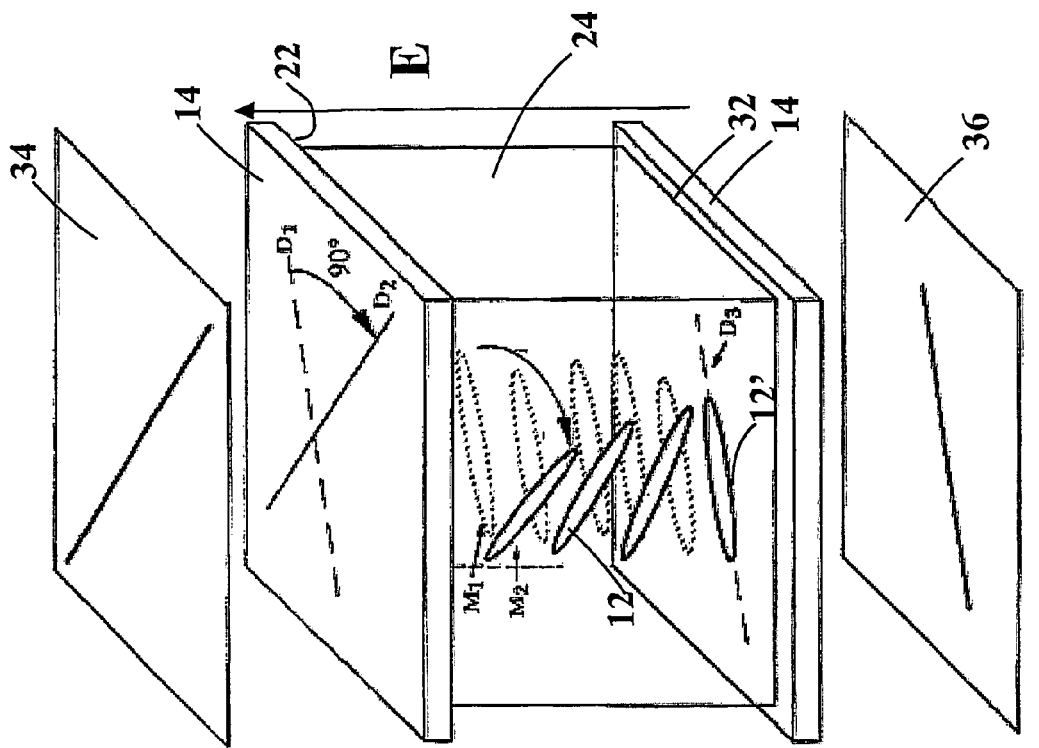
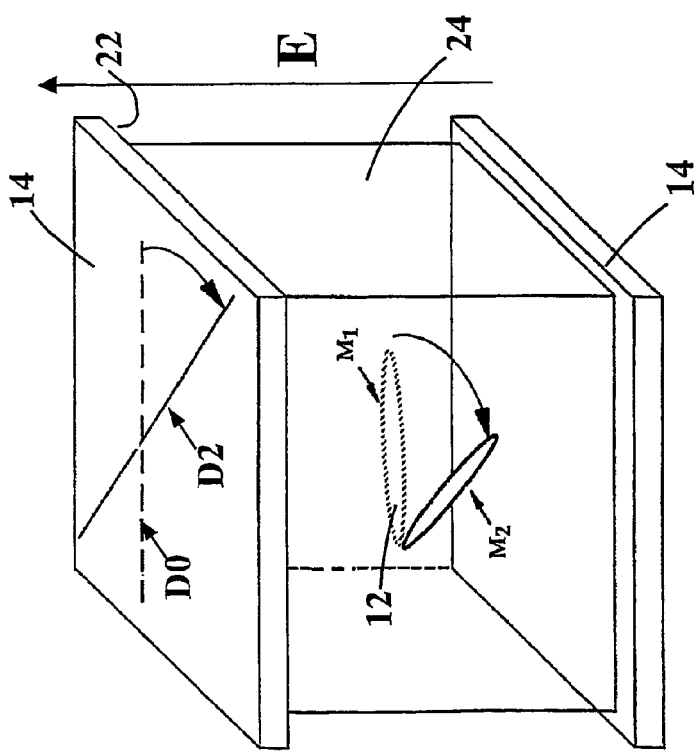
Fig. 2B
Fig. 2A

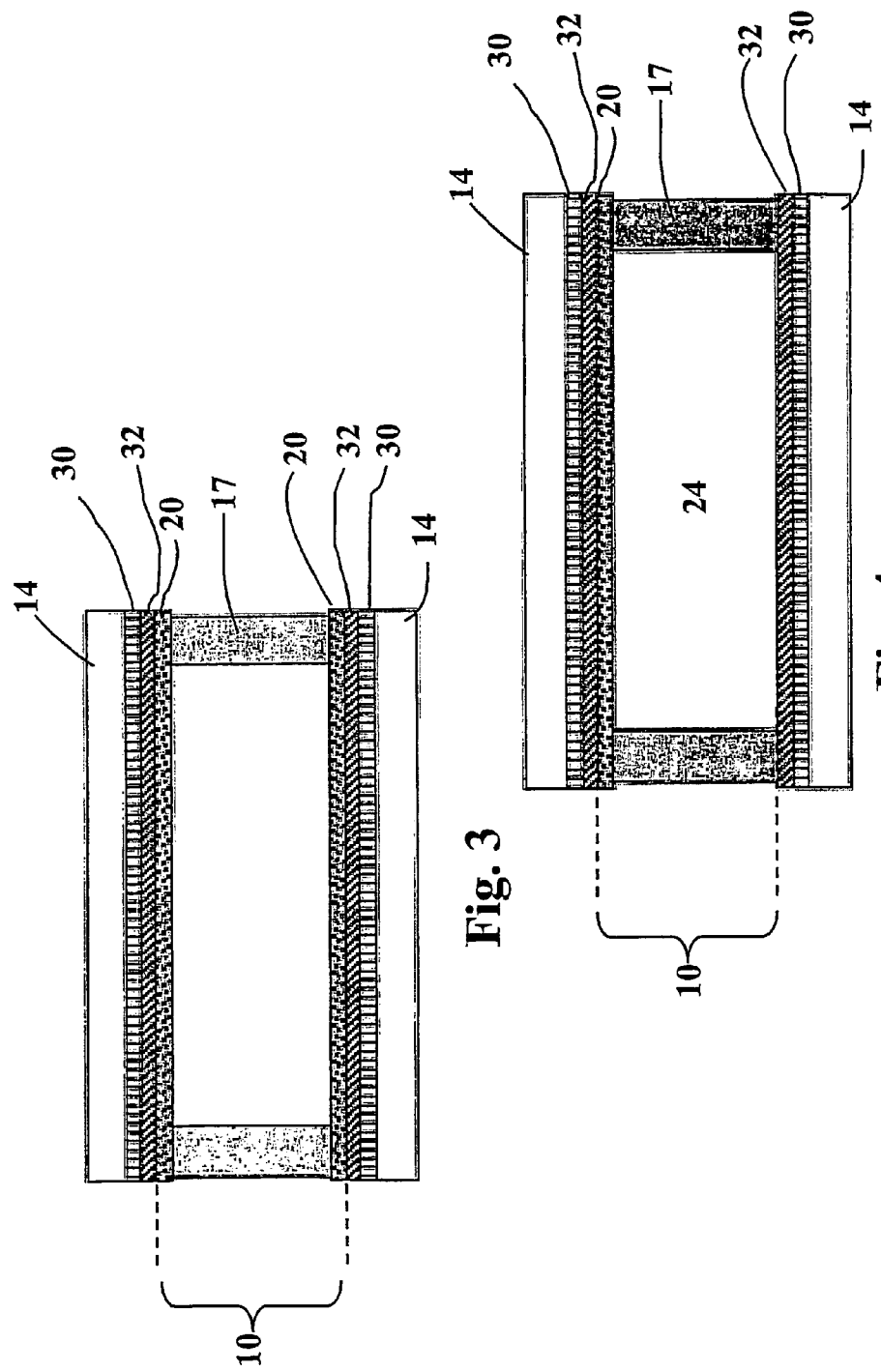

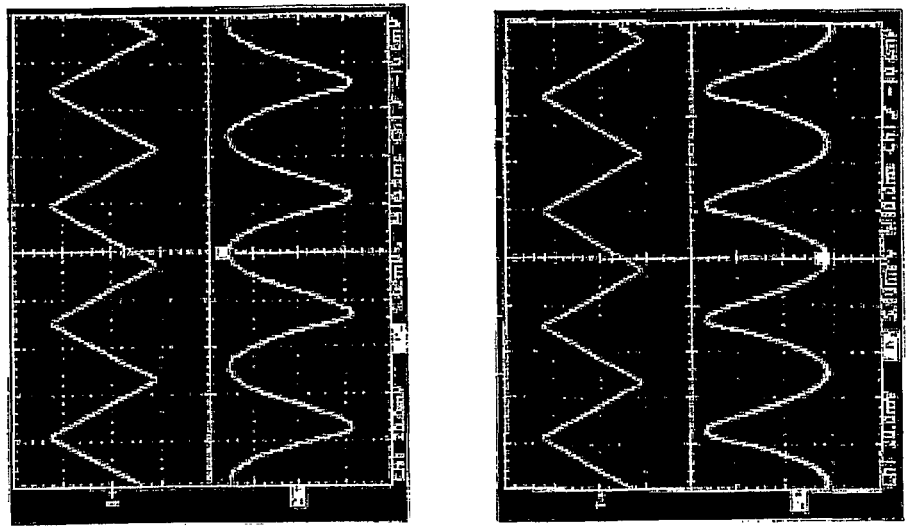
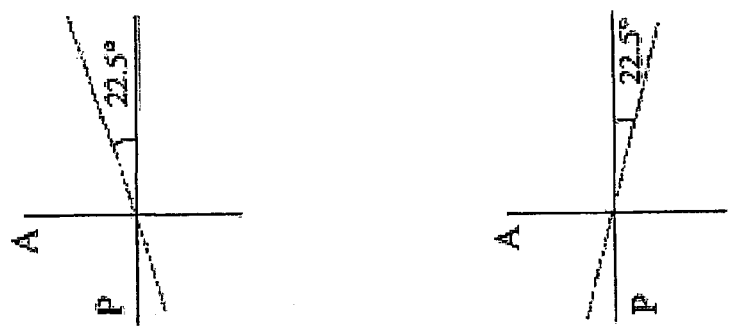
Fig. 8
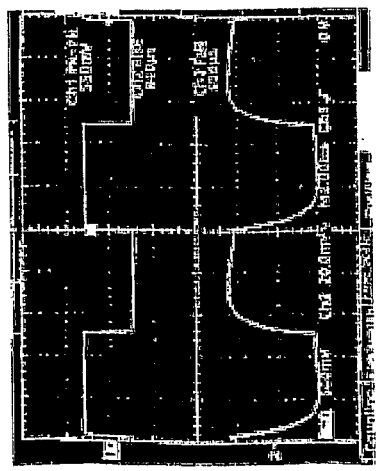
Fig. 7

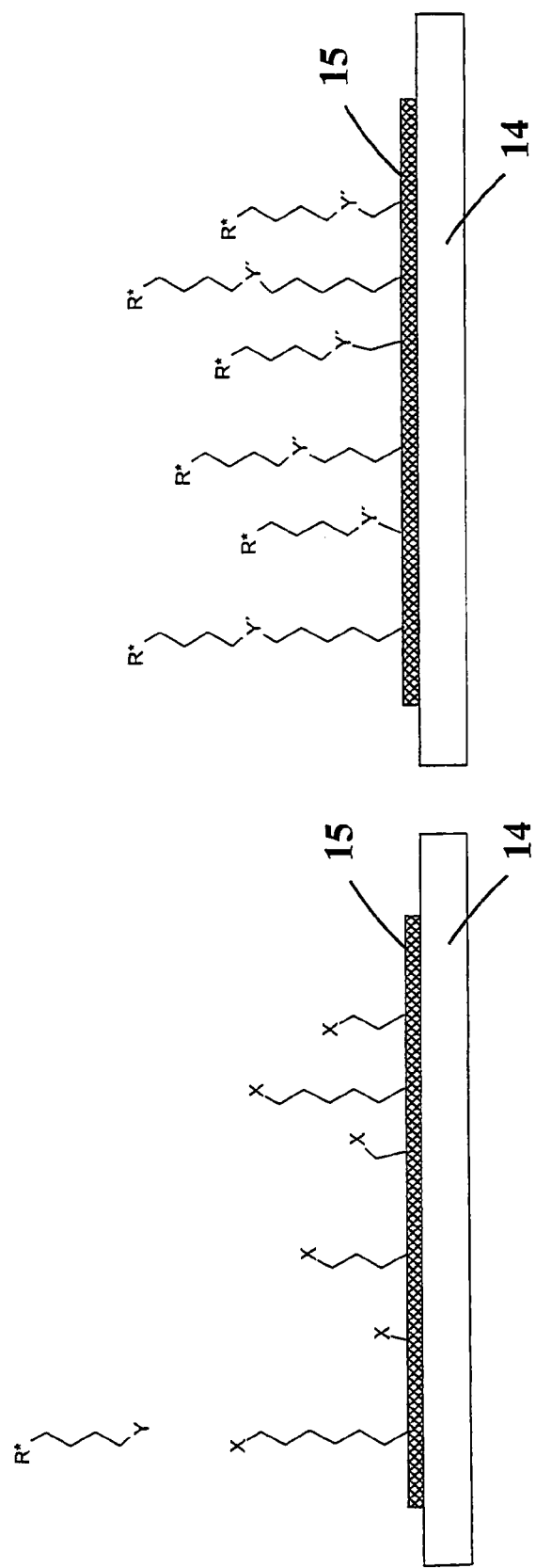

LIQUID CRYSTAL DEVICE, A METHOD FOR PRODUCING A LIQUID CRYSTAL DEVICE AND METHOD FOR CONTROLLING A LIQUID CRYSTAL DEVICE

TECHNICAL FIELD

The present invention is related to the field of liquid crystals. More specifically, it is related to a liquid crystal device including a liquid crystal bulk layer and chiral dopants dissolved in this layer in an inhomogeneous distribution manner. The invention also relates to a method for producing a liquid crystal device including chiral dopants inhomogeneously distributed in the liquid crystal bulk layer. The invention also relates to a method of controlling a liquid crystal device.

TECHNICAL BACKGROUND

Liquid crystals, widely used at present as electro-optical media in display devices, are organic materials with anisotropic physical properties. The operation of the liquid crystal displays is based on the changes of the optical appearance of the liquid crystal in the display caused by an applied electric field.

One of the basic operational principle of liquid crystal displays and devices is the switching of the orientation of the liquid crystal molecules by an applied electric field that couples to the dielectric anisotropy of the liquid crystal (dielectric coupling). Such a coupling gives rise to an electro-optic response quadratic with the applied electric field, i.e. independent of the field polarity.

Another operational principle of practical importance is the one utilizing linear coupling between an applied electric field and a spontaneous polarization Ps present in ferroelectric liquid crystals.

There exist a number of different types of LCDs whose operation is based on dielectric coupling, especially dynamic scattering displays, displays using deformation of homeotropically aligned nematic liquid crystal, Schadt-Helfrich twisted nematic (TN) displays, super twisted nematic (STN) displays, and in-plane switching (IPS) nematic displays.

Another type of LCDs is the surface stabilized liquid crystal (SSFLC) display that operates on the basis of the linear coupling between the applied electric field and the spontaneous polarization Ps. The applied electric field could also give rise to a spontaneous polarization that linearly couples to the field. The deformed helix ferroelectric (DHF) liquid crystal displays and the anti-ferroelectric liquid (AFLC) displays are based on this principle.

For modern applications, an LCD should possess several important characteristics, such as a high contrast and brightness, a low power consumption, a low working voltage, short switching times, a low viewing angle dependence of the contrast, a grey scale or bistability, etc. The LCD should be cheap, easy to produce and to work with. Non of the prior-art LCDs is optimised concerning all the important characteristics.

In most of the conventional nematic liquid crystal displays, operating on the basis of the dielectric coupling, the electric field is applied normally to the liquid crystal bulk layer. These displays are usually slow, and nearly all suffer from non-satisfactory angular dependence of the contrast due to the switching of the liquid crystal molecules in a plane formed by the initial orientation of the molecules and the applied electric field (so-called out-of-plane switching).

There is also another type of LCDs with in-plane switching, in which the electric field is oriented parallel to the liquid crystal bulk layer. These displays exhibit a very small angular dependence of the image contrast but the brightness and the switching times are not satisfactory.

Next, the other type of LCDs operating on the basis of the linear coupling between an applied electric field and the spontaneous polarisation in ferroelectric liquid crystals will be considered giving a short general description of the smectic liquid crystals with emphasis on ferroelectric liquid crystals and their application in the surface stabilised ferroelectric liquid crystal (SSFLC) display.

In a smectic liquid crystal, the molecules are arranged in adjacent smectic layers. The Smectic A and Smectic C phases are the two most important representatives of these "layered" phases of the liquid crystalline materials. In the Smectic A phase, the molecules are oriented along the smectic layer normal ($\theta=0°$), whereas in the Smectic C phase the molecules are tilted with respect to the smectic layers at angle typically in the order of 20°. Furthermore a smectic liquid crystal could be achiral (e.g. A or C) or chiral (e.g. A* or C*), where the term chirality means lack of mirror symmetry. It should be notified that the term "chiral" does not refer to the occurrence of a helical molecular ordering that may or may not appear as a secondary effect.

The chirality, i.e. the broken mirror symmetry of the constituent molecules, is a prerequisite for the appearance of ferroelectricity, i.e. of spontaneous polarisation Ps, in tilted smectic liquid crystals like Smectic C*. Ps is directed along the smectic layers, i.e. perpendicular to the molecular long axis, and it is sterically coupled to the molecules.

Ferroelectric phases exhibit not only the smectic liquid crystal materials built up of chiral molecules but also achiral smectic host materials doped with chiral dopants. Most of the available commercial ferroelectric liquid crystal materials are such mixtures. In these mixed systems it is much easier to combine the broad temperature range and low viscosity of the selected achiral smectic C host material with the large polarisation induced by the selected chiral dopants. The proper combination of these material parameters is of vital importance for the ferroelectric liquid crystal mixture.

In Smectic C*, the molecules, being free to rotate around a cone with apex angle $\beta=2\theta$, adopt a helical ordering due to chirality with a helix axis along the smectic layer normal. However, the Ps is spiralling, thus resulting in self-cancelling of the local polarisation. Therefore, in a bulk of Smectic C* there will be no macroscopic polarisation present (Ps=0). However, if an electric field is applied along the smectic layers of the helical Smectic C* bulk, the field will couple to the permanent dipoles aligning them parallel to the field. As a result, the electric field will unwind the helical order inducing macroscopic polarisation of the bulk of Smectic C* liquid crystal.

There is another way of suppressing the helical molecular order in order to obtain a spontaneous polarisation Ps in the bulk of Smectic C*. This is done by using the solid surface/liquid crystal interactions instead of an external electric field. This is the so-called surface stabilised ferroelectric liquid crystal (SSFLC) concept according to which the Smectic C* bulk is aligned in book-shelf geometry, i.e. with Smectic layers perpendicular to the confining surfaces.

In SSFLC displays, an external electric field applied along the smectic layers, i.e. perpendicular to the substrates, will switch the molecules of the ferroelectric liquid crystal between two positions on the smectic cone. These two positions correspond to the directions of Ps at different field polarity. An important feature is that the "flipp-flopp" mechanism ("the Goldstone mode) is much faster than the rather slow dielectric coupling mechanism that switches liquid crystalline materials having no permanent polarisation, such as conventional twisted nematic liquid crystal displays. Moreover, with a Proper surface treatment of the solid display substrates, the switching of the liquid crystal molecules in SSFLC displays can be bistable. In the single component FLCs as ell as in the FLC mixtures, the Ps present a homogeneous distribution in the bulk of these materials.

As an alternative to FLCs, the liquid crystal material could be in the so-called antiferroelectric (AFLC) liquid crystal phase, which means that in the absence of electric field, the molecules in adjacent smectic layers possess an opposite tilt. In an AFLC display, the dark state is obtained when placing the display between crossed polarizer set parallel and perpendicular, respectively, to the smectic layers. At this arrangement and when there is no applied electric field, the AFLC display is in the dark state. Under an applied electric field, both −E and +E give the same bright state. Thus, the AFLC display exhibits a three-state switching behaviour.

Drawbacks of the surface stabilized FLC and AFLC displays include difficulties in orienting the chiral smectic phases and maintaining their orientation. The FLC displays in addition have a sticking image problem due to building surface charged layers. The power consumption of these displays is also relatively high. Yet another draw-back is that the thickness of the liquid crystal layer in these devices must be of order 1-1.5 μm in order to obtain the unwound state of these materials. This requirement for small thickness makes the production of FLC and AFLC displays complicated, delicate and very expensive.

In the displays discussed above, the desired alignment of the liquid crystal layer is achieved by appropriate treatment of the confining solid surfaces like coating with organic or inorganic layers as well as using a mechanical buffing. In the absence of external fields, the initial liquid crystal alignment is defined by solid surface/liquid crystal interactions.

The orientation of the liquid crystal molecules at the solid surface is transferred to liquid crystal molecules in the bulk via elastic forces. For instance, near the substrate surface the liquid crystal molecules in general could be oriented perpendicular (homeotropic) or parallel (planar) to the substrate surface that impose the same alignment of the molecules in the bulk of the liquid crystal. Since the liquid crystals are strongly birefringent, any change in their alignment will result in a certain change in their optical performance as seen between suitable polarizers.

In the prior of art, there are in principal three different techniques for changing the optical performance of liquid crystals by accomplishing a new molecular orientation in the liquid crystals that differs from the initial alignment.

1. Reorientation by Application of an External Field

The first, most widely used technique for reorientating the molecules is to apply an external electrical field over the entire bulk liquid crystal layer. Due to direct coupling between the electric field and some of the liquid crystal material parameters, such as dielectric anisotropy and spontaneous polarization, the field will directly reorient the liquid crystal molecules in a new direction if their initial alignment does not correspond to a minimum energy of interaction of the electric field with some of the liquid crystal material parameters. However, in some cases the liquid crystal molecules near the solid surfaces are difficult to reorient by an electric field, due to the above-mentioned surface liquid crystal interactions, whereas the "bulk molecules" more remote from the surfaces are fairly free and therefore easy to reorient by the field.

2. Reorientation by Photo-Controlled Command Surfaces

The second known technique for reorienting the molecules of a liquid crystal layer is to design one or both of the confining alignment surfaces as a photo-controlled "command surface". Such a photo-controlled command surface is capable, when subjected to, for instance, UV light, to change the direction of alignment imposed by the surface on the liquid crystal molecules in contact with the surface.

The concept of "photo commanded surface" has been described by K. Ichimura in a number of papers overviewed in Chemical Reviews, 100, p.1847 (2000). More specifically, an azobenzene monolayer is deposited onto the inner substrate surface of a sandwich cell containing a nematic liquid crystal layer. The azobenzene molecules change their conformation from "trans" to "cis" under illumination with UV light. The azobenzene molecules are anchored laterally to the substrate surface by the aid of triethoxysilyl groups. The trans-isomer of azobenzene moieties imposes a homeotropic alignment of the nematic liquid crystal (liquid crystal molecules oriented perpendicular to the substrate surface), whereas the cis-isomer gives a planar orientation of the liquid crystal molecules (parallel to the substrate surface). Hence, the conformational changes of the molecules in the alignment layer caused by the UV illumination will result in a change of the alignment of the nematic liquid crystal molecules. The relaxation to the initial alignment is obtained by illuminating the sample with VIS-light or simply by heating it to the isotropic state.

A drawback of using photo commanded alignment surfaces in order to switch a liquid crystal alignment between two states is the low speed. In addition, so far the photo commanded alignment surfaces are shown to be effective only in nematic liquid crystal devices. Another drawback is that the life-time of a device having a photo commanded alignment surface is reduced by the degradation processes that take place due to UV-irradiation. Moreover, the use of light as external factor for switching the alignment of the liquid crystal is not convenient especially for liquid crystal displays.

Therefore, the performance of liquid crystal displays is chosen to be controlled by an external electric field instead of by light. The electric field directly couples with the bulk liquid crystal and changes alignment, thereby changing optical characteristics of the liquid crystal display, such as light transparency, light absorption at different wavelengths, light scattering, birefringence, optical activity, circular dichroism, etc.

3. Reorientation by Electrically Commanded Surfaces ECS

The third known principle for reorientating liquid crystal molecules involves the use of so-called Electrically Commanded Surfaces (ECS). This principle is described in the published International patent application No. WO 00/03288.

The ECS principle, which is faster, is used to primarily control a ferroelectric liquid crystalline polymer layer. As mentioned above, LCDs based on the linear coupling between the spontaneous polarisation in ferroelectric liquid crystals and an applied electric field perpendicular to the confining substrates has a number of advantages over LCDs based on a dielectric coupling. More specifically, ferroelectric LCDs are much faster, they allow an in-plane switching of the optic axis with image contrast less dependent on the viewing angle and, at proper anchoring conditions, ferroelectric LCDs makes it possible to achieve a bistable switching. However, as pointed out already, there are several problems related to the use of ferroelectric liquid crystals in displays and devices.

According to ECS principle, a separate thin ferroelectric liquid crystalline polymer layer is deposited on the inner surfaces of the glass substrates confining a liquid crystal bulk material in a conventional sandwich cell. The ferroelectric liquid crystalline polymer layer acts as a dynamic alignment layer imposing a planar alignment on the adjacent liquid crystal bulk material. More specifically, when applying an external electric field across the cell—and thereby across the dynamic alignment layer—the molecules in the separate ferroelectric liquid crystalline polymer layer will switch. This molecular switching in the separate polymeric layer will, in its turn, be transmitted into the bulk volume via elastic forces at the boundary between the separate alignment layer and the bulk layer, thus resulting in a relatively fast in-plane switching of the bulk volume molecules.

The ECS principle seems to have all advantages of the ferroelectric liquid crystals avoiding at the same time most of their serious problems. However, there are still several requirements that the ECS materials should meet that make the preparation of ECS somehow quite demanding:

The ECS layer should be very thin (100-200 nm).

The ECS layer should preferably be well oriented in bookshelf geometry, i.e. with smectic layers normal to the confining substrates.

In order to keep the ECS layer and it operation intact, the material of ECS layer must be insoluble in the liquid crystal bulk material.

In the light of the above-mentioned desired properties of a liquid crystal device, and the above-mentioned different drawback of the known liquid crystal displays, a general object of the present invention is to accomplish an improved liquid crystal device, an improved method for manufacturing a liquid crystal device, and an improved method of controlling a liquid crystal device. The invention is not directed to displays only, but is useful in many other liquid crystal applications.

DESCRIPTION OF THE INVENTION

According to a first aspect of the invention, there is provided a liquid crystal device, comprising a liquid crystal bulk layer and chiral dopants being inhomogeneously distributed in the bulk layer as a result of being permanently attached to at least one surface, termed chiral surface, said chiral dopants being soluble in the liquid crystal bulk layer.

This is in clear contrast with the prior-art solution of having a separate, non-soluble ECS layer.

The invention makes it possible to induce a local variation of one or more chirality-related physical properties (herein also referred to as effects of chirality), especially a local increase of one or more chirality-related physical properties, within a restricted volume (here termed "sub-volume" or "sub-region") of the bulk layer adjacent to said chiral surface. Thus, the induced variation or increase of an effect of chirality does not take place in the whole volume of the bulk layer, but only in one or more restricted regions, which in most implementations of the invention would be very thin. Considering that each such sub-region is located near an associated chiral surface, such a sub-region could also be termed "surface sub-region".

The dopant material and the liquid crystal bulk material may be selected such that the induced local variation/increase of an effect of chirality within the sub-volume causes the appearance of a spontaneous polarisation increase at said sub-volume. Such an induced spontaneous polarisation increase would normally present a non-homogenous distribution, being maximum at said chiral surface and dropping in a direction away from said chiral surface. Such a spontaneous polarisation may, in its turn, provide ferroelectric properties that allows direct electrical coupling to an external electrical field.

As used herein the term "soluble" means that the dopants are able to dissolve in the liquid crystal bulk layer. According to the invention, the chiral dopants are permanently attached to a surface. This should be interpreted as the dopants are bonded to the surface in such a way that they are prevented from freely moving out in the bulk volume. Thus, the inhomogeneous distribution of the dopants in the bulk volume is of a "permanent" nature, since a homogenous distribution will not take place. Obviously, this differs from known techniques of temporarily repositioning dopants within a liquid crystal bulk volume by means of an applied external electrical field.

Although the dopants are "permanently attached" to the surface, they may still present a limited movability, especially a movability that allows the dopant molecules to reorientate at the surface, e.g. during switching by an applied external electrical field.

Although not homogeneously distributed in the bulk layer, the dopants may be referred to as (locally) dissolved in the bulk layer.

Within the scope of the invention, the device may present a single chiral surface or, as an alternative, two or more such chiral surfaces each having its chiral dopants permanently attached thereto. More specifically, the device may comprise two or more essentially similar chiral surfaces, or two or more different chiral surfaces, or combinations thereof. For instance, two chiral surfaces may result in induced spontaneous polarisations of different sign, they may present different twisting powers, different dopant material, different surface distribution of the dopants, etc.

The term "surface" when referring to the abovementioned "chiral surface" should be held to comprise not only a surface located at or defining the boundary of the bulk layer, but also a surface or a plane located inside the bulk layer. Thus, the term "surface" may comprise any surface physical or geometrical surface or plane having contact with the bulk layer material, directly or indirectly via the dopant material.

In those embodiments where the bulk layer is confined between two substrates, a chiral surface may be arranged on one or both substrates. As an alternative, or as a complement, one or more chiral surfaces may be located inside the bulk layer, i.e. at a distance from the bulk layer boundaries. Embodiments having internal chiral layers or planes may be implemented by e.g. a laser-activated polymerisation process as described below.

The dopant material or molecules permanently attached to the surface may be considered as defining a "chiral surface layer". Such a "chiral surface layer" would normally be very thin, e.g. in the order of 20 to 100 Å. Especially, the thickness of the chiral surface layer (which extends into the bulk layer) may be formed as a "monolayer" comprising one layer of dopant molecules only.

In this context it should be noted that the principle of attaching the chiral dopants to a surface gives a "bonus effect", considering that an ECS layer preferably should be very thin in order to achieve the aimed-at effect. For instance, the chiral dopants may form a monolayer on said surface.

In the device according to the invention, the dopants, which are soluble in the liquid crystal bulk layer, are inhomogeneously distributed in the bulk volume as a result of being permanently attached to at least one surface. However, as to the distribution of the dopants over said surface(s), many possibilities exist. In one preferred embodiment, the dopants are evenly distributed over the surface or over each surface. However, it may also be possible to distribute the dopants according to a specific or predetermined pattern over said surface(s), e.g. within predetermined areas.

As an illustrative example only, the bulk layer may comprise an achiral (non-chiral) liquid crystal material, such as an achiral Smectic C material. In the sub-volume, or sub-region, the achiral Smectic C is doped by chiral dopants being soluble in the achiral Smectic C and permanently attached to the chiral surface. The dopants induce chirality, and thus variation of effect(s) of chirality, in the liquid crystal bulk material within the sub-volume. The induced chirality, in its turn, may give rise to a spontaneous polarisation Ps within the sub-volume giving this sub-volume ferroelectric properties. The actual volume of the sub-region being doped and the volume presenting chirality and an increased spontaneous polarisation may differ slightly, since the dopant molecules will induce chirality also at a certain distance from the dopants. In this illustrative example, by applying an electrical field over the device (i.e. over the doped sub-volume as well as over the rest of the bulk volume), the molecules in the region presenting ferroelectric properties as result of the dopants may be switched very fast due to the direct ferroelectric response or coupling to the applied electrical field. This fast ferroelectric switching will, in its turn, result in a fast switching of the bulk molecules outside the sub-volume, because of the elastic coupling between the molecules in the surface sub-region and the adjacent molecules of the bulk volume.

In the example described above, the bulk volume comprises an achiral liquid crystal material. However, it is also possible to use an initially chiral bulk material, presenting for instance a limited spontaneous polarisation in its non-doped condition. In such an embodiment, the dopants may be selected to accomplish a variation of the spontaneous polarisation within the sub-volume that increases the (e.g. ferroelectric) response of the bulk material within the sub-volume. The initial chirality could be said to "bias" the induced increase of an effect of chirality.

The electrical field response of the bulk material—inside as well as outside the doped sub-volume—may be ferroelectric, antiferroelectric, flexoelectric and paraelectric or any combination thereof. The electrical field response of the undoped bulk material may also be dielectric only, i.e. no direct linear coupling with the electric field.

As to the initial chirality of the bulk layer material, the bulk layer may comprise an achiral liquid crystal material, such as an achiral nematic liquid crystal material; a chiral liquid crystal material; or combinations thereof. If the bulk material is achiral, a chirality may be induced by the dopants. If the bulk is initially chiral, an increased effect of chirality may be induced by the dopants.

Thus, the liquid crystal material(s) forming the bulk layer may vary considerable within the scope of the invention. Depending on the field of use, the material(s) for the bulk layer may be selected from one or more of the following: nematic liquid crystal materials having a twisted or non-twisted configuration of a nematic director within said bulk layer; smectic liquid crystal materials having a twisted or non-twisted configuration of a nematic director within said bulk layer; and discotic liquid crystals materials.

The bulk layer may present a surface director having a preferred orientation that is substantially parallel to said chiral surface. Especially, the bulk layer may comprise a liquid crystal material being such that switching of said surface director of the bulk layer is not directly controllable by an applied electric field. In such an embodiment, the doped area may present a direct response to an applied electrical field (primary switching), whereas the rest of the bulk layer will response to an elastic coupling (secondary switching).

The device may further comprise a separate alignment layer arranged to provide a preferred molecule orientation at said chiral surface, e.g. a non-dynamic alignment layer.

The chiral dopants may comprise photosensitive molecules, the photosensitivity being used during the manufacture of the device for forming the chiral surface with the dopants attached thereto.

The chiral dopants may be produced from at least one of a polymer material, an oligomer material and a monomer material.

An liquid crystal device according to the invention may be structurally implemented in many different ways. In embodiments with one chiral surface only, the bulk layer may be confined between, on the one hand, the single chiral surface arranged on a first side of the bulk layer and, on the other hand, a non-dynamic surface alignment layer arranged on an opposite side of the bulk layer. The non-dynamic surface alignment layer will establish a predetermined preferred direction, which may be chosen depending on the intended use of the device.

The bulk layer may also be confined between two chiral surfaces, each having chiral dopants permanently attached thereto. However, the dopants would still be inhomogeneously distributed in the bulk layer in permanent manner, i.e. presenting a high "concentration" at the chiral surfaces. In such a double-sided embodiment, the two chiral surfaces may induce a spontaneous polarisation of equal or of opposite sign (Ps>0 and Ps<0). The first chiral surface may comprise a chiral material presenting a first handedness, whereas the second chiral surface may comprise a chiral material presenting a second, different handedness. Furthermore, multiple chiral surfaces may be made from chiral materials having different twisting powers.

As stated above, two chiral layers may differ from each other in respect of (i) the sign of the spontaneous polarisation, (ii) the sign of the handedness and/or (iii) the twisting powers. The same consideration applies between the chiral layer(s) on the one hand and the bulk properties on the other hand. Thus, as an example, the bulk material may present a property that may be counteracted or even substantially cancelled by the dopants within the doped sub-region(s)

The inventive liquid crystal device may comprise means, such as surface electrodes, for applying an electric field over the sub-volume(s) at the chiral surface(s). Such field applying means may be arranged such that the electric field is applied over said chiral surface(s) as well as over the bulk layer. Such field applying means may comprise two intersecting electrode groups for producing a matrix addressed device, wherein each pixel of the device may contain a thin film transistor (TFT) for producing active addressing.

The inventive liquid crystal device may comprise means arranged to transform a directional switch of a director within the bulk layer into a detectable effect. As an example, such means may comprise one or more of the following components: polarizers, retarders, reflectors and dyes doped into the bulk layer, and combinations thereof.

In one embodiment, the chiral dopants may induce in the sub-region of a nematic bulk layer a helical molecular order with a helix axis perpendicular or parallel to the chiral surface. The pitch gradient may vary over the device.

According to another aspect of the invention, there is provided a method for manufacturing a liquid crystal device, comprising the step of distributing chiral dopants in a permanently inhomogeneous manner in a liquid crystal bulk layer, said chiral dopants being soluble in the liquid crystal bulk layer.

Preferably, the method comprises the step of permanently attaching the dopants to at least one surface, termed chiral surface, such as a confining surface (e.g. a surface on a substrate) or an internal surface (e.g. defining a plane within the bulk layer), or combinations thereof.

The material in the bulk layer and the dopants may be selected such that the chiral dopants induce a local variation of one or more chirality-related physical properties, especially an increase of one or more chirality-related physical properties, within a sub-volume or sub-region of the bulk layer adjacent to said chiral surface.

The chiral surface may be produced by coating a substrate surface with a chiral material. In one embodiment, the chiral surface may be arranged on an alignment layer already deposited on a substrate surface. The chiral surface may be produced by applying light and/or temperature in order to obtain a polymerisation of a chiral surface layer.

In one embodiment, the dopants may be provided by the sub-steps of coating said surface with a dopant material that is chiral, polymerisable and photosensitive; aligning the molecules within the dopant material in a preferred direction by subjecting the dopant material to light; and subjecting the thus-aligned dopant material to a polymerisation in order to form a chiral surface layer.

In embodiments where one or more internal chiral surfaces or planes should be produced, in order to provide associated sub-regions with an induced effect of chirality, a photoreactive chiral monomer may be dissolved in a liquid crystal bulk layer. The thus dissolved photoreactive chiral monomer may then be light-activated in one or more planes in said bulk layer for producing such internal chiral planes. To this effect, a mask could be used, or an interference pattern.

The invention also provides a method of controlling a liquid crystal bulk layer, comprising the step of doping a liquid crystal bulk layer with chiral dopants being soluble in the liquid crystal bulk layer in order to induce, in at least one sub-region of the bulk layer, a local, preferably permanent increase of an electrical field response property, and the step of applying an electrical field for controlling the bulk layer indirectly via said sub-region.

Specifically, the invention provides a method for accomplishing an in-plane switching in a liquid crystal bulk layer of a liquid crystal device, comprising the steps of providing, in contact with said bulk liquid crystal layer, at least one chiral surface layer which induces in an associated sub-surface region of said bulk layer a phase having a director direction which is directly controllable by an electric field and which interacts with said bulk layer, and applying an electric field over said sub-surface region in order to produce a directional change in said sub-surface region and, thereby, an in-plane bulk switching within the bulk layer.

Thus, the invention makes it possible to achieve a local variation of one or more of the chirality-related physical properties (herein also referred to as effects of chirality) of a liquid crystal host material, like spontaneous polarisation, pitch, optical activity, etc, which in its turn may be used for controlling the bulk layer indirectly via the doped region.

The above and other features and embodiments of the invention are set out in the attached claims.

BRIEF DESCRIPTION OF DRAWINGS

The invention will now be more fully described by way of non-limiting examples, with reference to the accompanying drawings, in which:

FIG. 2A schematically illustrates a field-activated molecular reorientation in a single-sided embodiment of a liquid crystal device according to the invention.

FIG. 2B illustrates the operation of the device in FIG. 2A inserted between crossed polarizers.

FIG. 3 is a schematic cross section of a double-sided embodiment of a liquid crystal device according to the invention.

FIG. 4 is a schematic cross section of a single-sided embodiment of a liquid crystal device according to the invention.

FIGS. 7 and 8 illustrate electro-optic responses of an embodiment of the invention.

FIG. 14A and 14B schematically illustrates an example of preparing a chiral layer.

DESCRIPTION OF EMBODIMENTS OF THE INVENTION

Figure 1:
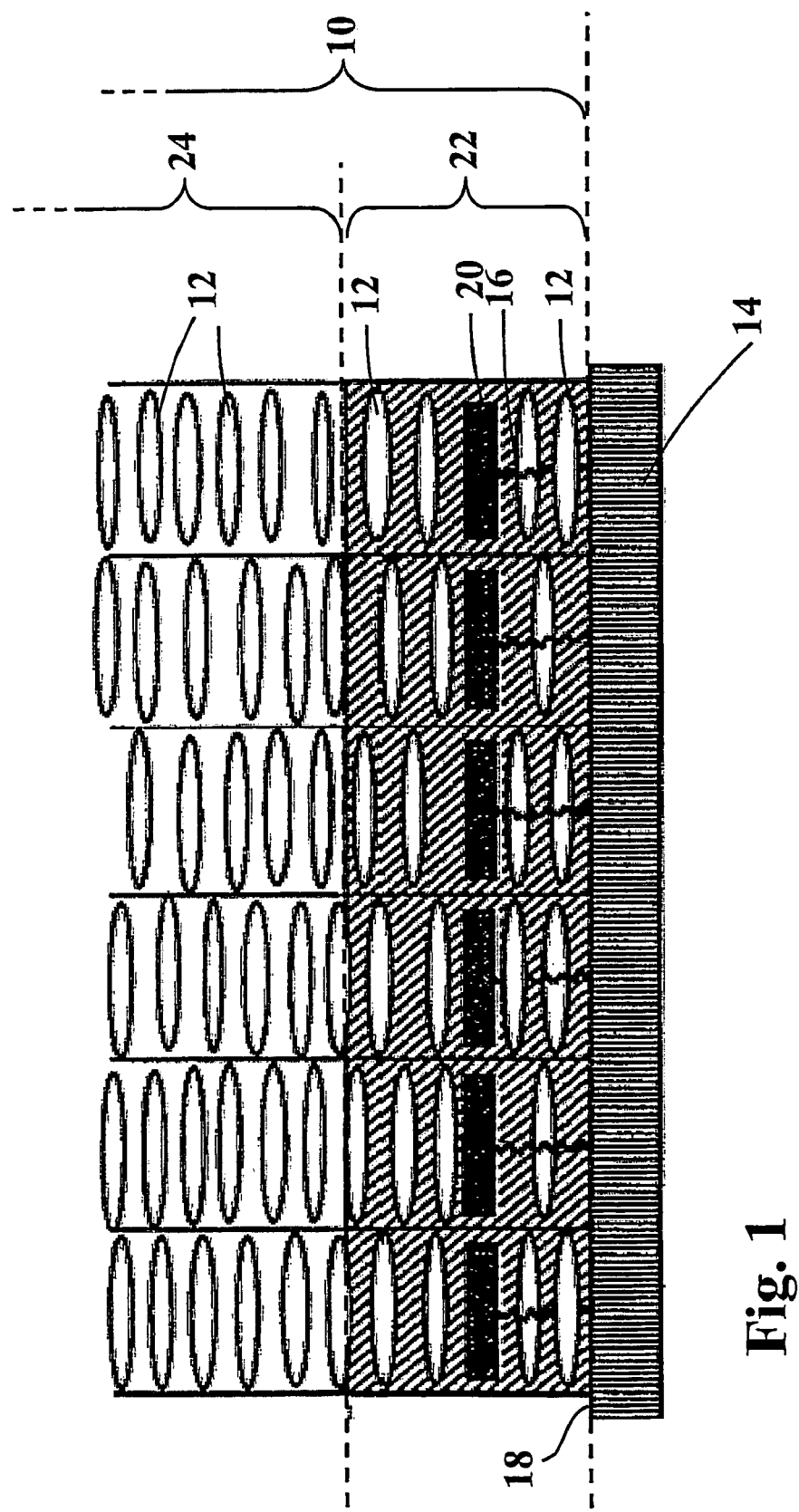
FIG. 1 schematically illustrates the principle of the invention.

FIG. 1 schematically illustrates a part of an embodiment of a liquid crystal device according to the invention. A bulk layer 10 containing liquid crystal bulk molecules 12 is confined between two opposite substrates 14 (of which only one is illustrated in FIG. 1), such as glass plates. As a non-restricted, illustrative example only, the bulk material 12 may be an achiral Smectic C material.

Chiral dopants 20 being soluble in the liquid crystal bulk layer are permanently attached (bonded) to the substrate 14, as schematically illustrated by bonds or links 16, e.g. implemented as chemical bonds. Thus, even though the dopants are soluble in the bulk layer, the dopants 20 are not free to move out in the rest (24) of the bulk layer 10 but are maintained attached to a surface 18 of the substrate 14.

However, the dopants 20 may still be able to reorientate in response to an applied electrical field.

The chiral dopants 20 induce an effect of chirality in a sub-volume or sub-region 22 of the bulk layer 10 close to the substrate 14. The thickness of this surface sub-region depends i.a. on the nature of the chiral layer covering the substrate surface 18, but would normally be very thin. As a consequence, the device will present a doped sub-volume or sub-region 22 of the bulk layer 10 presenting an increased effect of chirality, and a non-doped substantially larger bulk volume 24 with zero or low effect of chirality.

As schematically illustrated in FIG. 1, the dopants 20 may be located at such a distance from the surface 18 that allows bulk molecules 12 to be located close to the substrate 14 within the doped region. The surface 18 of the substrate 14 to which the dopants 20 are permanently attached may be referred to as a "chiral surface", indicating that it presents chiral dopants attached thereto. The dopants attached to the surface may be referred to as a "chiral surface layer". However, it should be noted that the dopants as such may be located at a restricted distance from the surface via e.g. chemical bonds. Normally, the sub-region will comprise both the dopant material/molecules and some of the bulk layer molecules.

Now, the induced effect of chirality in the sub-region 22 is an induced spontaneous polarisation Ps in this region 22. This, in its turn, will result in a ferroelectric electro-optic response of the liquid crystal material within the sub-region 22.

The operation of a device comprising the structure according to FIG. 1 will now be described with reference to FIG. 2A. When an electric field E is applied over the entire liquid crystal cell, the direction of the orientation of the liquid crystal molecules in the ferroelectric sub-region 22 will change, due to the presence of the spontaneous polarisation Ps in the region and, consequently, the direct electrical coupling between the liquid crystal material within the ferroelectric sub-region 22 and the applied electrical field E. In FIG. 2A, this molecule orientational change is schematically illustrated in FIG. 2 by a dotted line D0 (a possible initial direction at E=0) and a solid line D2 (switched direction; E≠0). This could be referred to as a "primary switching".

The primary switching D0→D2 of the liquid crystal molecules 12 in the sub-region 22 will, in its turn, penetrate via elastic forces into the bulk 24 of the achiral Smectic C liquid crystal material 12.

Since only one of the inner surfaces 18 of the two substrates 14 is made chiral, the molecular switching D0→D2 in the sub-region 22 will result in a field-induced twist state in the bulk, schematically illustrated in FIG. 2A by the molecular in-plane switching M1→M2 (secondary switching). Depending on the sign of the dielectric anisotropy $\Delta\epsilon$ of the bulk liquid crystal material 12, the dielectric coupling between the field E and the bulk material can stabilise ($\Delta\epsilon<0$) or destabilise ($\Delta\epsilon>0$) this in-plane switching M1→M2.

Reference is now made to FIG. 2B, illustrating a cell according to FIG. 2A with only one of the substrates 14 being covered by a chiral layer 20.

In this embodiment, the bulk achiral smectic material 12 possesses a molecular tilt of about 45 degrees. The surface of the other substrate 14 was covered with polyimide, unidirectionally rubbed, resulting in a non-dynamic surface alignment layer 32. The alignment layer 32 establishes a non-dynamic surface alignment direction D3 of the bulk molecules 12' located at this substrate 14. The alignment direction D3 coincides with the preferred alignment direction D1 of the molecules (M1) at the other substrate surface 14 for E≠0. It shall be noted that D1 represents one of the two switching states of the ferroelectric subregion.

In the "off-state" (E=0), the bulk liquid crystal material 12 is oriented homogeneously with the optic axis along direction Ml (parallel to D1), as illustrated by dotted molecules in FIG. 2B. The cell is placed between crossed polarizers 34, 36 oriented with the transmission direction of on polarizer 36 along the optic axis M1. In this arrangement, incident light will be extinguished under its the passage through the device. However, the application of an electric field of E of say about 5V/µm induces a direct, fast 90 degrees switching (D1→D2) of the molecules in the ferroelectric sub-region 22 at the chiral surface 18. This fast switching D1→D2 will, in its turn, result in an induced 90 degrees molecule twist M1→M2 in the bulk liquid crystal material. In this switched "on-state", the device is light transmitting.

By another suitable setting of the polarizers 34, 36, the "off-state" can be made transmissive instead.

FIG. 3 illustrates a cross section of a liquid crystal device or cell including two chiral solid substrates 14, each presenting an inner surface 18 that have been made chiral. The cell comprises (starting from the top) the following components: a first glass or plastic (polymer) substrate 14, a first transparent conductive ITO (Indium Tin Oxide) film 30, a first passive (non-dynamic) alignment film or layer 32, a first relatively thin (preferably very thin) layer of chiral molecules 20, a bulk layer 24 of liquid crystal bulk material 12, a second relatively thin layer of chiral molecules 20, a second passive alignment film 32, a second transparent conductive ITO (Indium Tin Oxide) film 30, and a second glass or plastic substrate 14. The two substrates 14 are fixed at a predetermined mutual distance by spacers 17. This spacing may be in the order of several µm.

The cell illustrated schematically in FIG. 3 is a double-sided embodiment of the invention including two thin films of chiral molecules 20 on opposite sides of the bulk layer 24. The cell illustrated in FIG. 4 is a single-sided embodiment including only one thin film of chiral molecules, i.e. according to the embodiment shown in FIGS. 2A and 2B.

EXAMPLE 1

Method of Preparation

In one embodiment for the preparation of a chiral surface layer as illustrated in FIG. 3 or 4, the inner surface of the glass or plastic substrate 14 is first covered by transparent, conductive ITO film 30 and, thereafter, with an alignment layer 32 of e.g. a thin Au film, evaporated at normal incidence. The alignment layer 32 may be a passive alignment layer.

Then, the alignment layer 32 is covered by a thin film 20 comprising, in this example, a photosensitive organic material including chiral molecules 20. This chiral material 20 may be of the side-on type of attachment of chiral moieties at ortho- or meta-position anchored on to Au film through sulphur-containing group. The molecular structure of the organic chiral material 20 may be the following:

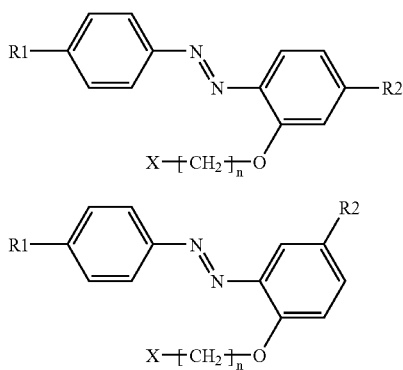

R1 = alkyl or alkoxy group
R1 = alkyl or alkoxy group
R1 or R2 is chiral
n = 2–20

X = —SH
—S—R3
—S—S—R3

The substrate 14, which now has been covered by the thin layer of photosensitive chiral material 20, is exposed to linearly polarised UV light in order to obtain a unidirectional planar, predetermined alignment of the chiral molecules 20. This alignment of the chiral molecules 20 transfers, via elastic forces, to the liquid crystal bulk molecules 12 in contact. The light activated alignment make take place after as well as before the bulk layer 10 is applied.

EXAMPLE 2

Method of Preparation

In a second example, the chiral surface may be prepared by a thin film of organic material containing a mixture of chiral molecules of the same kind as in the Example 1 but in this case they possess different length of the coupling group as shown schematically below:

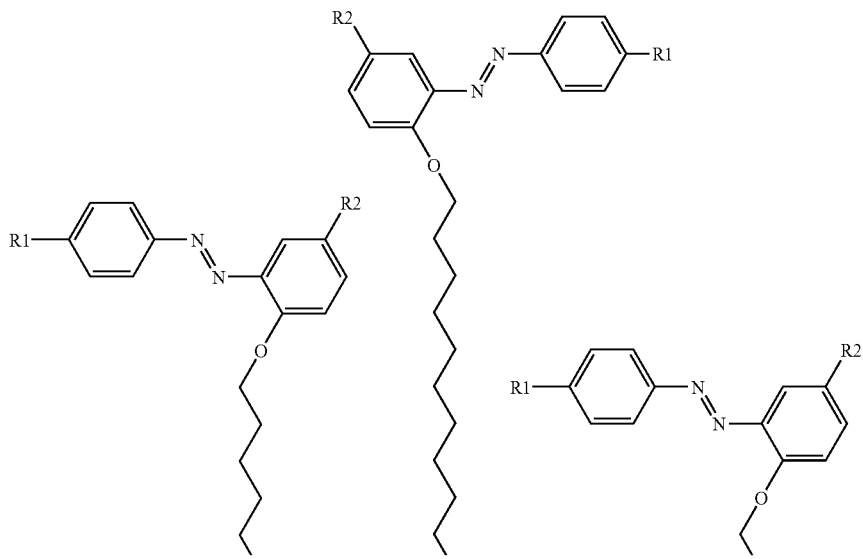
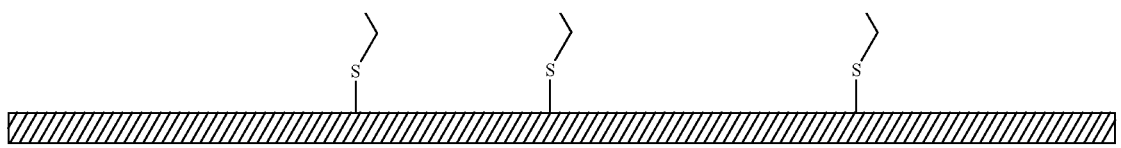

The length of the coupling group will define the maximum distance between the chiral dopant molecule and the surface. However, the chiral dopant molecule may be free to move in a direction towards the surface.

EXAMPLE 3

Method of Preparation

According to Example 3, in order to prepare a chiral surface forming e.g. the first thin film of chiral molecules 20 depicted in e.g. FIG. 4, the transparent conductive ITO film 30 of the glass substrate 14 is covered by a passive alignment layer 32 of buffed $SiO_x$ film, evaporated at normal incidence, for instance. As well known, this passive alignment layer gives unidirectional planar alignment of most liquid crystal materials. The same kind of alignment could be obtained by evaporating the $SiO_x$ film 32 at angle of incidence $\alpha \sim 60°$ with respect to the substrate surface 18. Thereafter, the passive alignment layer 32 is covered by a thin film of photosensitive organic chiral material 20 of the kind described in example 1. The molecules of this material may be permanently attached to the silica surface by the use of e.g. silylation.

EXAMPLE 4

Method of Preparation

According to Example 4, the transparent conductive ITO film 30 of the substrate 14 is covered by a passive alignment layer 32 of $SiO_x$ film, evaporated at angle of incidence a equal to e.g. about 85° with respect to the substrate surface 18. This passive alignment layer 32, as known, provides a tilted alignment of most of liquid crystal materials. Thereafter, the passive alignment layer 32 is covered by a film of photosensitive organic chiral material 20 of the kind described in Example 1 permanently attached to the silica surface.

EXAMPLE 5

Method of Preparation

According to Example 5, the contact surface 18 is made chiral by a deposition of a chiral side-chain liquid crystal polymer with structure that e.g. may be one of the following:

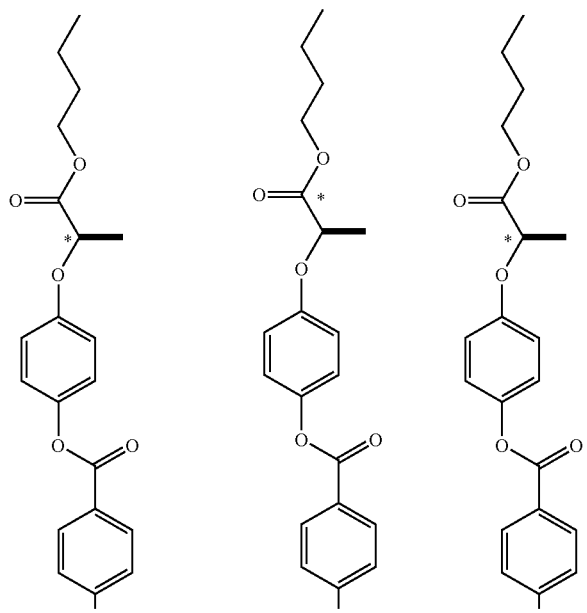

-continued
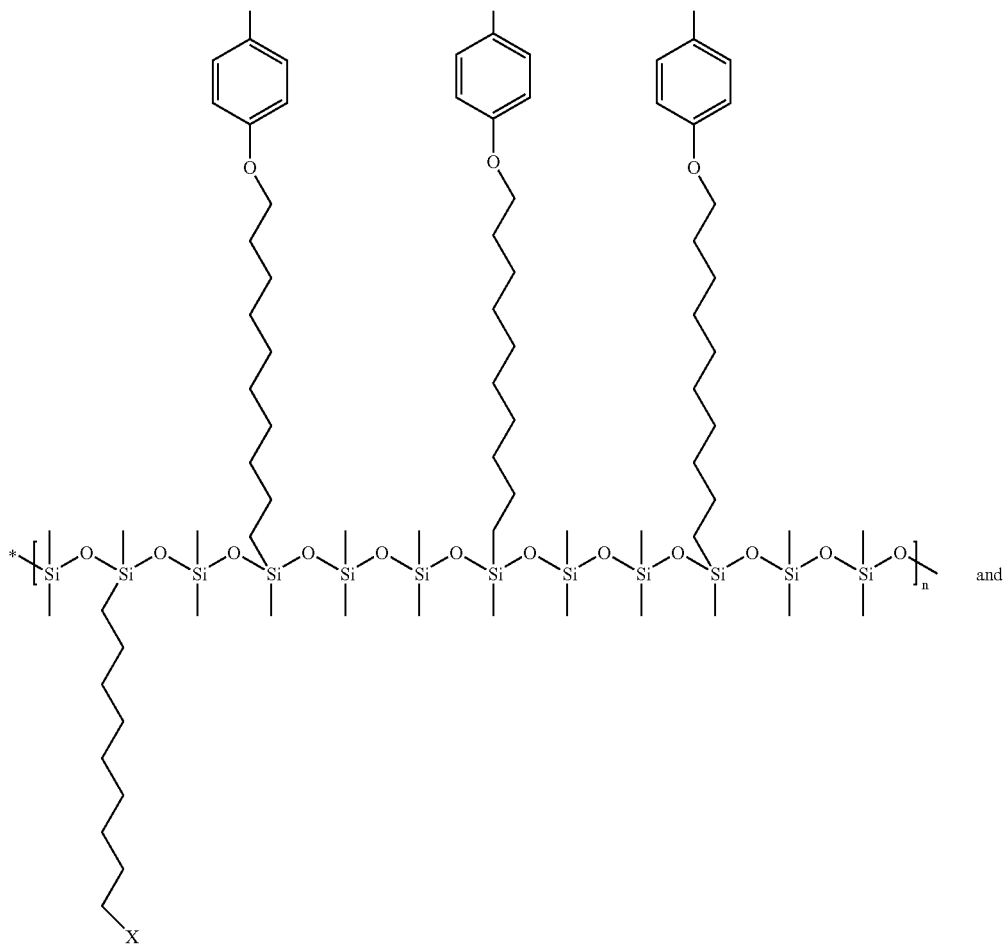 and

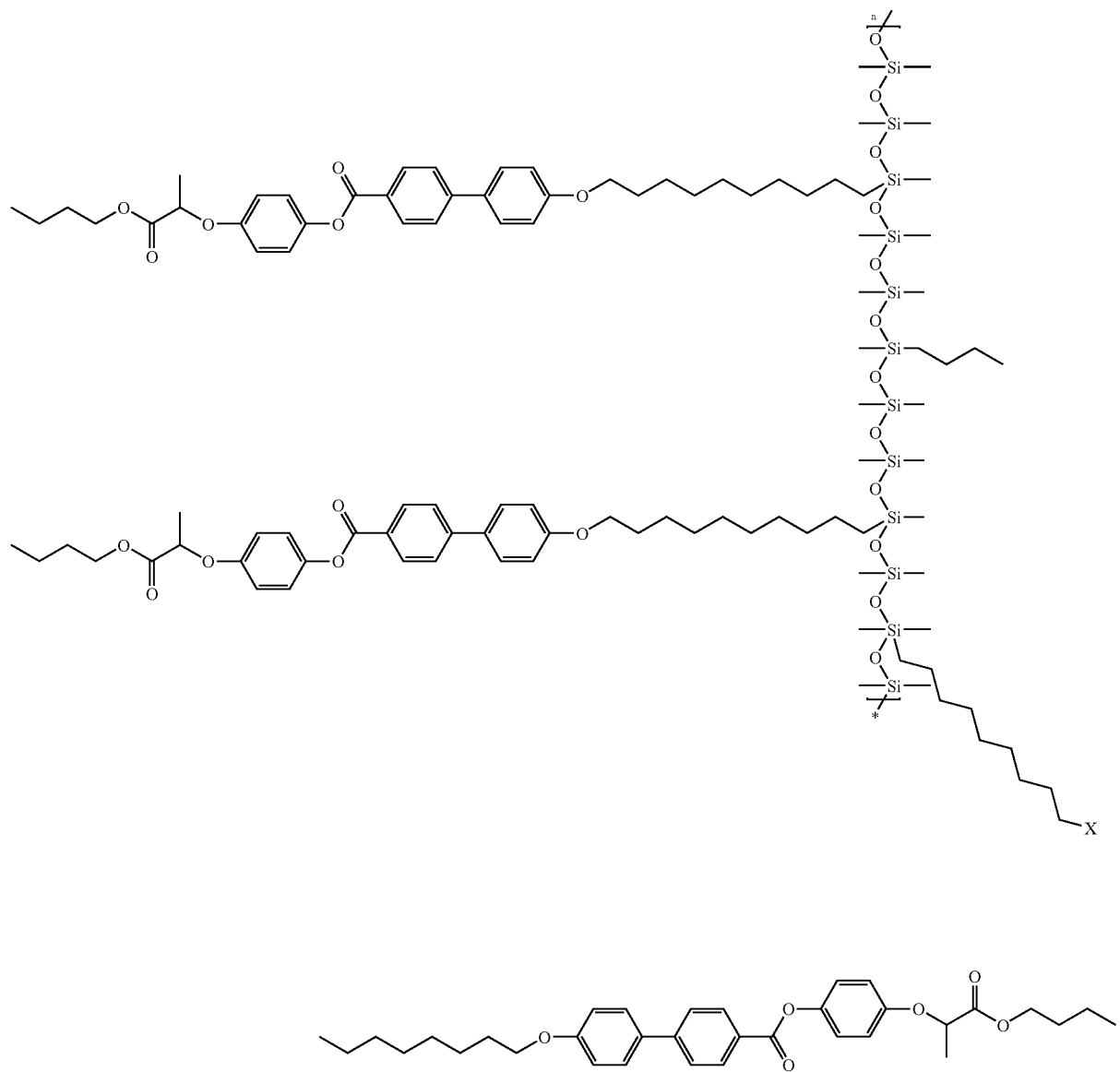

EXAMPLE 6

Method of Preparation

According Example 6, the chiral dopants 20 forming the chiral surface are of dendrimeric type having a structure that may be the following:

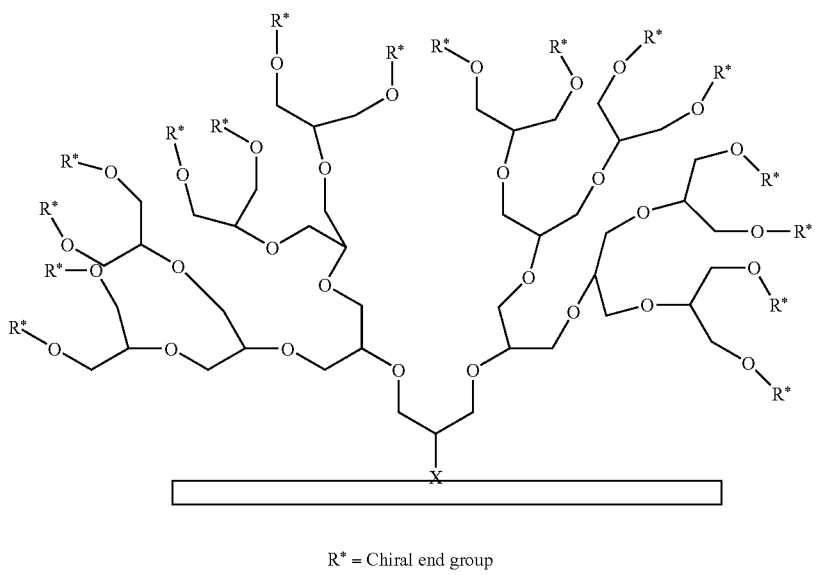

R* = Chiral end group

Figure 15:
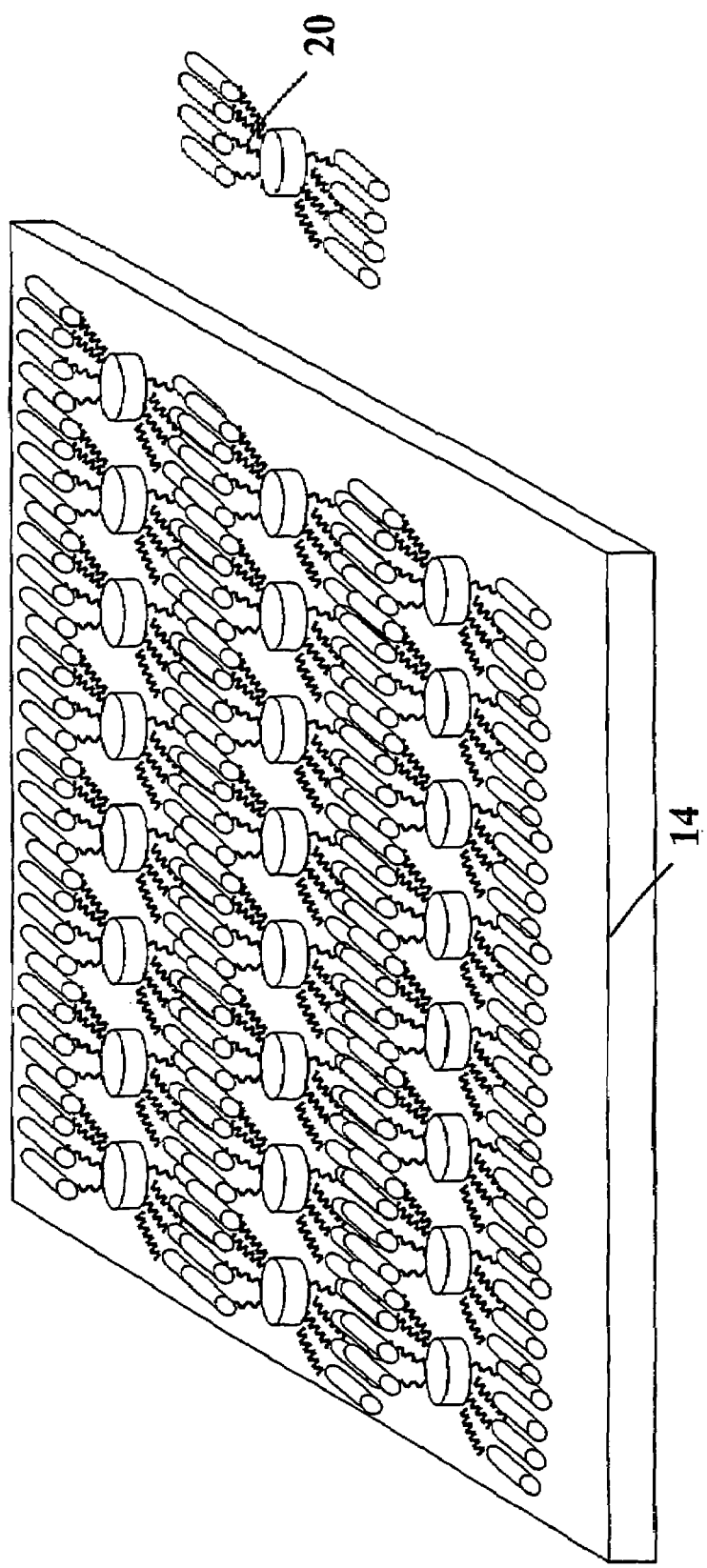
FIG. 15 schematically illustrates a chiral surface presenting dendrimeric chiral molecules.

The dendrimeric molecules are permanently attached to the passive alignment layer through either sulphur or silicon-containing bridging group. FIG. 15 illustrates schematically a chiral layer formed by dendrimeric molecules 20.

EXAMPLE 7A

Method of Preparation

According to Example 7A, a permanent inhomogeneous distribution of the chiral dopants 20 in the liquid crystal bulk layer 10 is implemented by forming at least one chiral plane internally within the liquid crystal bulk layer 24. This may be implemented by the use of a photo reactive chiral monomer and a crosslinker, the structures of which may be the following:

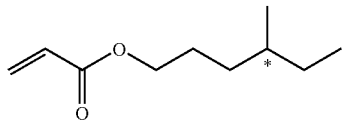

-continued

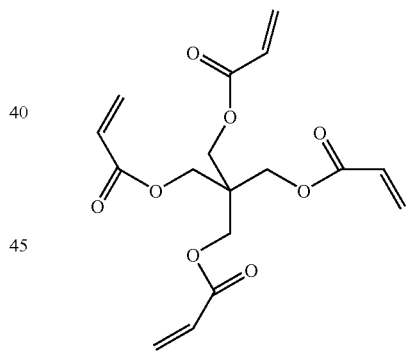

Initially, the photoreactive chiral monomer is dissolved in the bulk liquid crystal host material. Then, a sandwich cell, comprising two glass substrates 14 precoated on their inner sides 18 with ITO film 32 on which is deposited a passive alignment layer 30, is filled with a liquid crystal bulk material 12 with the chiral monomer dissolved therein. Thereafter, the cell now containing the bulk 12 and the dissolved chiral monomer is exposed to light. The light triggers the photo-polymerisation of the photoreactive chiral monomeric molecules. The wavelength of the light is usually in the UV-light spectrum for promoting the photopolymerisation process. During this polymerisation process, the polymer is phase separated from the liquid crystal host 12.

By using the above principle, well-defined planes (i.e. surfaces) of the phase-separated chiral polymer 20 in the liquid crystal bulk 10 may be achieved through interference of two beams from e.g. Ar-laser, or by means of a masking technique.

Figure 5B:
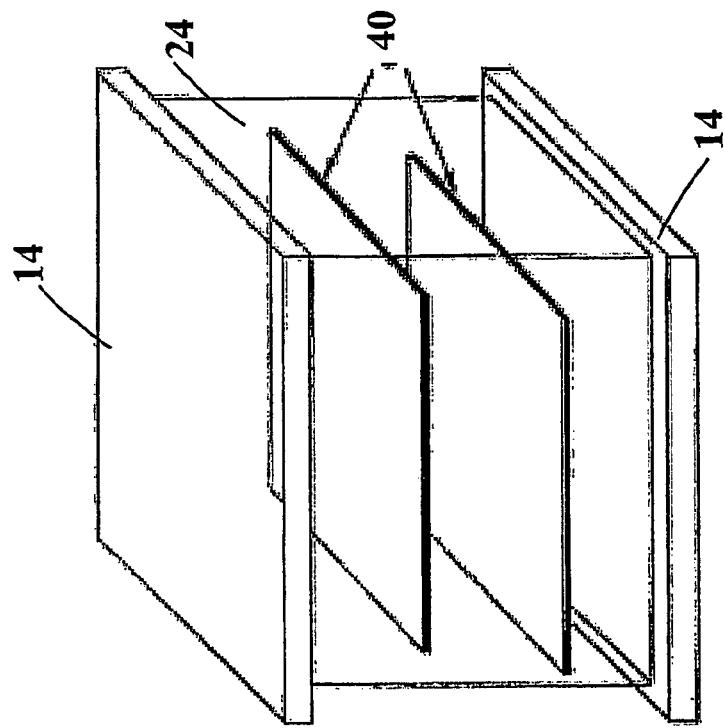
FIGS. 5A and 5B are schematic perspective views illustrating embodiments of the invention having internal chiral planes in a bulk layer.
Figure 5A:
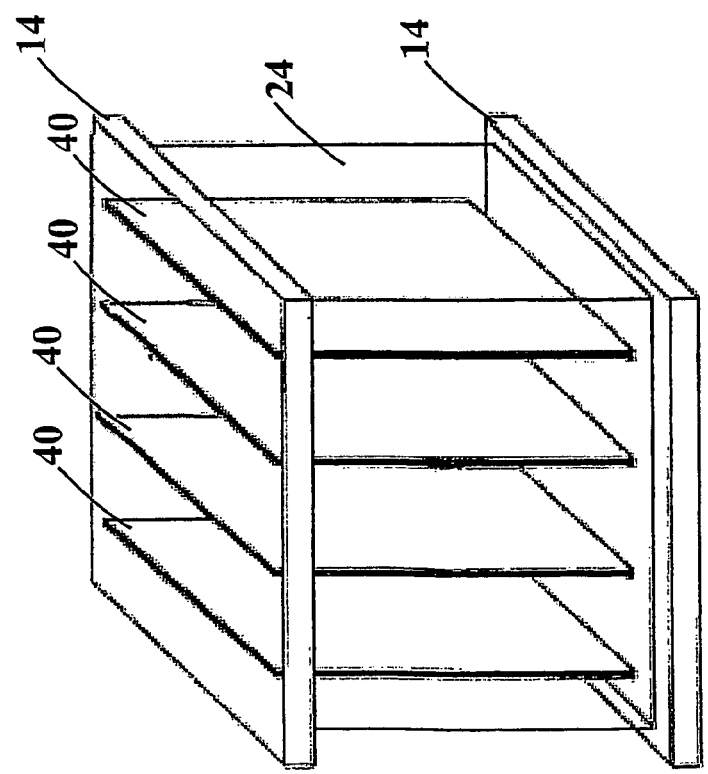

One or more such chiral planes 40 may be oriented perpendicular or parallel to the solid substrates 14 as shown in FIGS. 5A and 5B, respectively. Combinations thereof is possible, as well as the combination of internal chiral planes 40 with one or two chiral sub-surface layers at the substrates 14.

EXAMPLE 7B

Method of Preparation

According to Example 7B, as illustrated schematically in FIGS. 14A and 14B, the substrate 14 is covered with a thin layer 15 of a polymer containing functional groups that can give a chemical coupling to a chiral dopant or molecule 20. Prior to the attachment of the dopant 20 (FIG. 14A), the polymer 15 layer may be subjected to unidirectional mechanical rubbing to obtain a preferential direction of alignment of the subsequently applied dopant molecules 20 as well as the liquid crystalline bulk material 12. Thus, said polymer layer 15 may play the role of a passive alignment layer.

The material of the polymer 15 may be photo responsive and thus make photo alignment possible through illumination with polarized UV light. In this case, the dopant material 20 may be applied before or after the alignment process.

As an example, the dopant 20 may be in the form of a chiral molecule or a chiral polymer or a chiral liquid crystalline polymer.

In-Plane Switching of Bulk Liquid Crystals

Several examples will now be given illustrating the use of the inventive principle for obtaining an induced in-plane switching.

The liquid crystal device with chiral surface(s) used in the following examples included two parallel solid substrates 14, forming a micron-size gap, whose inner surfaces 18 were covered with ITO electrodes. The inner surface of one or both electrode substrates was coated with a thin chiral film 20. The structures of the experimental devices were as those illustrated in FIGS. 3 and 4.

Figure 6:
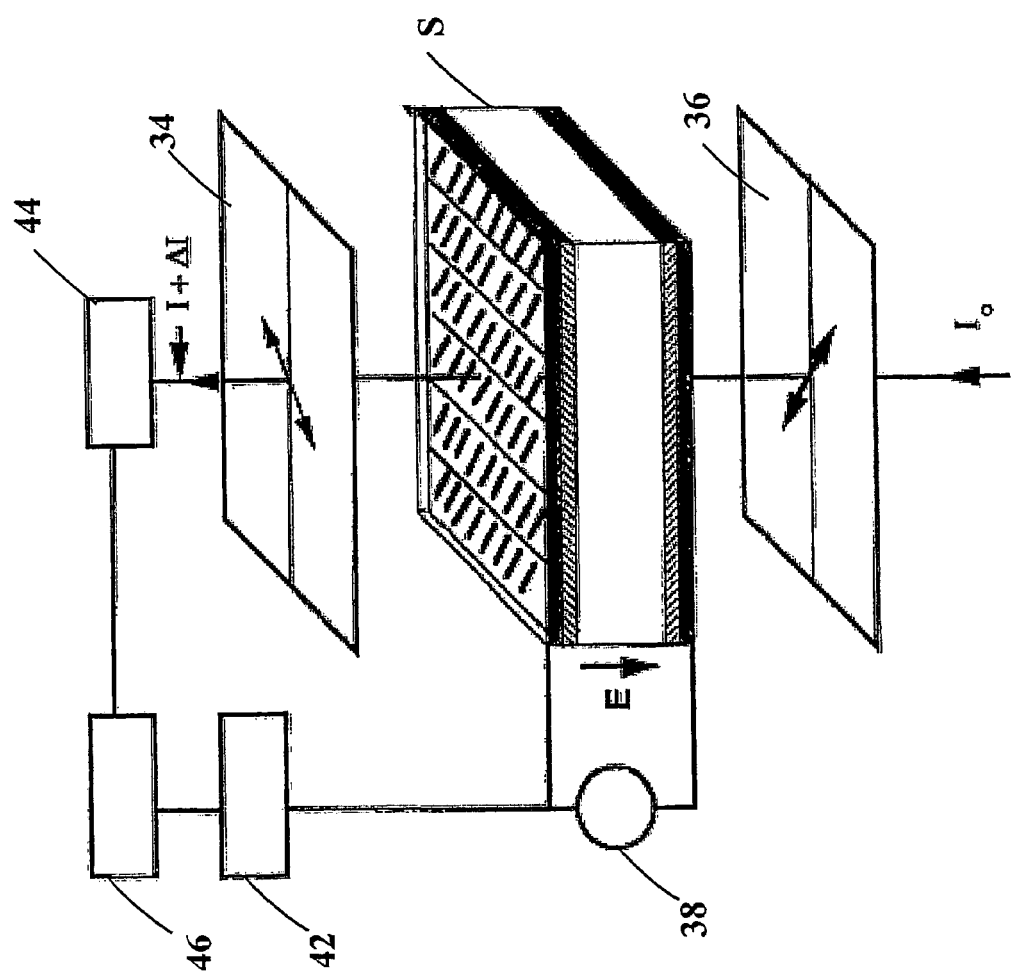
FIG. 6 is a schematic illustration of a set-up for analysing the electro-optic response of a liquid crystal device or cell according to the invention.

The electro-optic response of the experimental cells was detected by means of the set-up depicted schematically in FIG. 6.

The sample S was inserted between two crossed polarizers 34, 36 (analyser and polarizer) with its optic axis oriented at angle 22.5 degrees with respect to the transmission direction of the one of the polarizers for achieving a maximum light modulation of the transmitted light when an electric field E, supplied by a generator 38, is applied to the sample. If necessary the applied voltage can be amplified by a differential voltage multiplier 42. The transmitted light intensity I was detected by means of a detector 44. An oscilloscope 46 was connected to the voltage supply 38 and to the light detector 44 for visualising the applied voltage and the corresponding electro-optic response of the cell S.

EXAMPLE 8

Single-Side Embodiment

In Example 8, one of the inner surfaces of the device was pre-coated with a chiral organic layer according to Example 1. For producing the bulk liquid crystal layer 10, the device was filled with achiral liquid crystal material 20 Hoechst 908, possessing the following phase sequence C 10° C. SmC 63° C. SmA 64° C. I The cell was inserted in the set-up in FIG. 6 between crossed polarizers 34, 36 with its optic axis oriented at 22.5 degrees with respect to the one of the polarizers. Here it should be noted that a "conventional" prior-art cell filled with this liquid crystal material but having no chiral layer deposited on the inner substrate surface would exhibit a dielectric response only to an applied external electric field E. However, in the inventive cell with one of the inner surfaces pre-coated with thin chiral layer there was found a distinct polar electro-optic response in the smectic phase on applying an electric field E of about E=5V/µm to the cell with a cell gap of 3 µm.

The electro-optic response for the cell according to Example 8 is depicted in FIG. 7, which clearly demonstrates that the response is polar. The optic axis of the sample S was proved to switch in the plane of the sample simply by rotating the sample S at 45 degrees which then results in a 180 degrees phase shift of the electro-optic response depicted in FIG. 8.

EXAMPLE 9

Switching the Handedness of Circular Polarised Light

In this Example 9, an embodiment of a liquid crystal device is disclosed that may be used for switching the handedness of circular polarised light. The embodiment is schematically illustrated in FIG. 9A. In contrast to the single-sided embodiment illustrated in FIG. 2B, the embodiment in FIG. 9A presents a chiral surface of dopant material 22 at both substrates 14. Thus, a thin layer presenting induced ferroelectrical properties was formed on both sides of the LC bulk layer.

In FIG. 9A, the device parameters were chosen in such way to fulfil the $\lambda/4$ wave plate conditions. The bulk achiral smectic liquid crystal material 20 was chosen to possess 45 degrees molecular tilt angle. The device was inserted between crossed polarizers 34, 36 with the switching states (D1/D2) being symmetrically disposed about the transmission direction of the polarizers 34, 36 as shown.

The application of an electrical field E will provide a fast (direct) switch in the ferroelectrical layers 22 and, via elastic coupling, a corresponding in-plane switching in the bulk layer 24. Since two primary switching layers 22 are arranged, and these switches in the same direction in this embodiment, there will be essentially no helix twist of the bulk molecules 12 within the bulk layer. Thus, the handedness of circularly polarised light at the output of the device depends on the polarity of the applied electric field E. In this way, a fast switching of the handedness of the circularly polarised light can be implemented.

As pointed out above, the dielectric coupling can stabilise ($\Delta\epsilon<0$) or destabilise ($\Delta\epsilon>0$) the in-plane switching.

EXAMPLE 10

In-Plane Switching of Bulk Liquid Crystals

In this Example 10, a device prepared according to Example 1 was filled with the racemic liquid crystal mixture WILC 48 (Hoechst) with a phase sequence:

SmC 48° C. SmA 57° C. I

The same kind of polar electro-optic response in the SmC phase as the one shown above was detected in a cell with gap of 3 μm on applying an electric field of E~4 V/μm.

EXAMPLE 11

Double-Sided Embodiment—Achiral Bulk

Figure 9B:
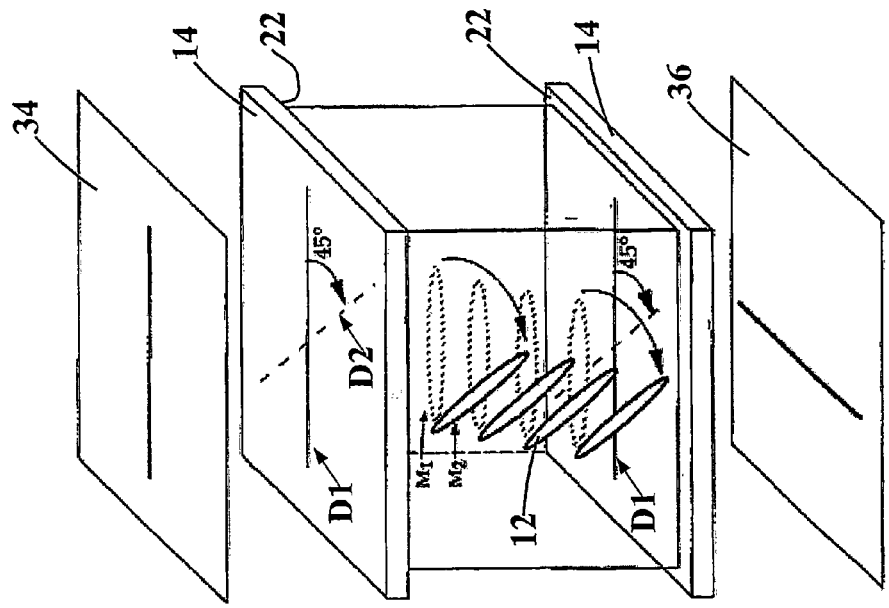
FIG. 9A and 9B schematically illustrate a field-activated molecular reorientation in double-sided embodiments of a liquid crystal device according to the invention.
Figure 9A:
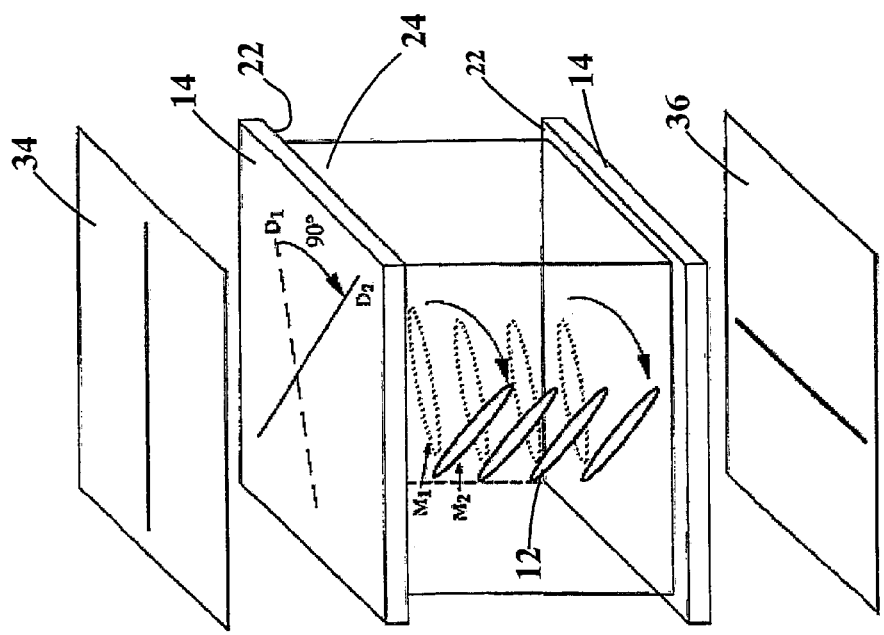

In this Example 11 as illustrated in FIG. 9B, both substrates 14 of the liquid crystal device were precoated with a chiral organic layer 22 according to Example 1. The device was filled with achiral liquid crystal material Hoechst 908.

Then, the cell was inserted between crossed polarizers 34, 36 with its optic axis M1 (corresponding to one of the switching states) oriented parallel to the transmission direction of one of the polarizers. Applying an electrical field E across the liquid crystal cell results in an orientational change of the molecules in the two surface sub-regions 22, as indicated by the transition D1→D2 at both sub-regions 22. This primary switching D1→D2 of the surface molecules in the sub-regions 22 with induced chirality will, in its turn, result via elastic forces in a switching (secondary switching) of the molecules 12 within the rest (24) of the bulk layer 10 of the achiral bulk molecules 12. This induced bulk molecule switching is schematically indicated by the initial molecule orientation M1 (dotted line) switching to a new direction M2 (solid line). The induced bulk switching of the optic axis of the bulk is in fact an in-plane switching (as in FIG. 2B), e.g. the switching M1 to M2 takes place in a plane parallel to the substrates 14.

A similar polar response as above was found in the smectic phase on applying an electric field of about E~5V/μm to the cell with a cell gap of about 3 μm.

EXAMPLE 12

Double-Sided Embodiment—Chiral Bulk

In this example similarly to the one described in Example 11, both substrates having a inner surface precoated with a thin chiral organic layer according to Example 1.

The device was filled with a ferroelectric liquid crystal with a very low spontaneous polarisation Ps. In this case, the chiral molecules attached to the substrate surface resulted in an increase of the magnitude of Ps in the sub-surface region. In this embodiment with an initially limited chiral bulk material, an applied electric field E will also couple directly with the bulk liquid crystal material. The switching at the chiral surfaces will be more efficient, since the chirality is "biased" by the initial chirality of the bulk material.

EXAMPLE 13

Greyscale

Figure 10:
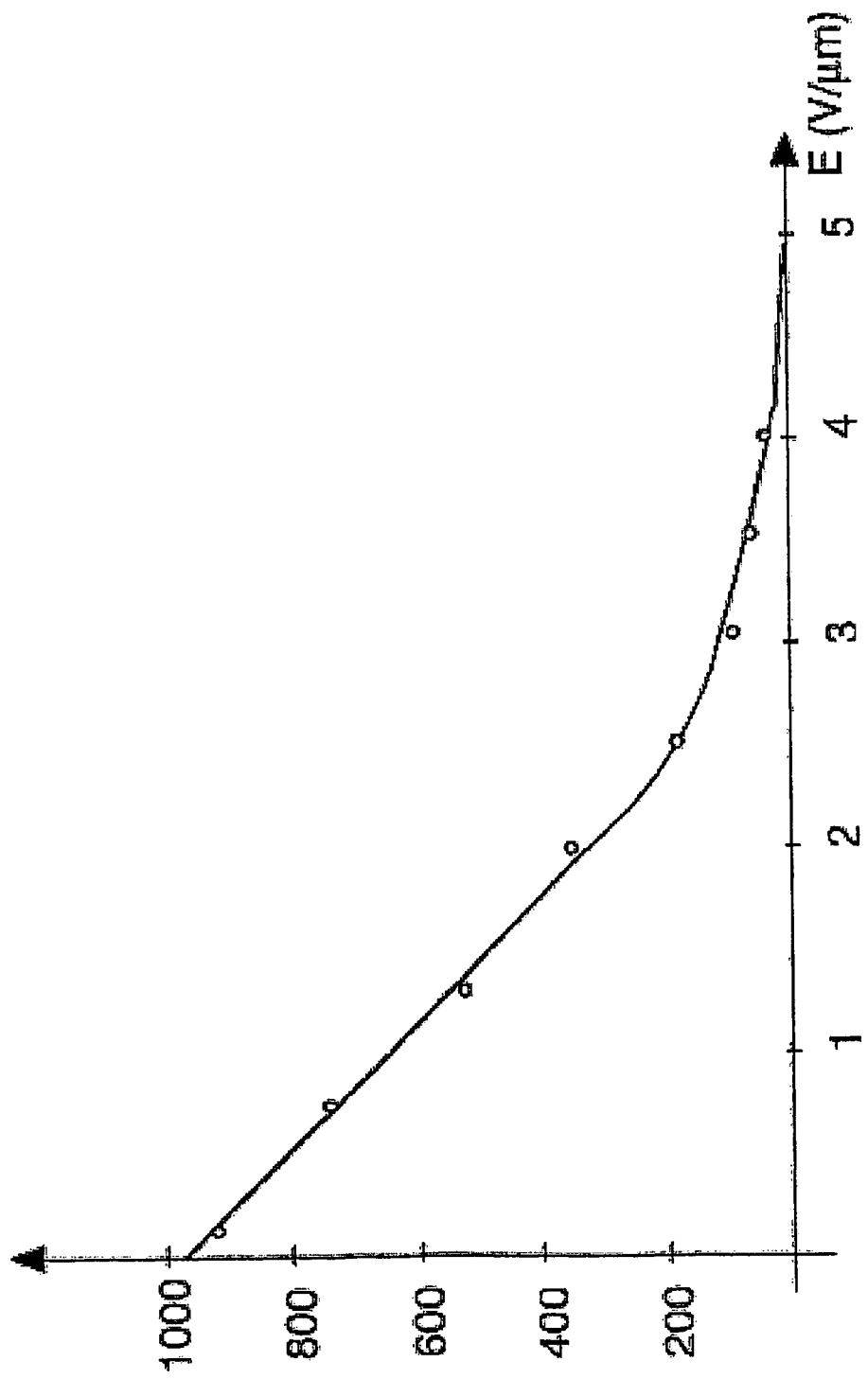
FIG. 10 illustrates a grey-scale electro-optical effect of an embodiment according to the invention.

This example describes how the invention can be used to implement a grey scale function. A cell was prepared according to the embodiment shown in FIG. 2B. A mechanical shear achieved by unidirectional displacement of the cell substrates with respect to each other results in a pretilt of the molecules in the surface sub-region as well as in the bulk of the liquid crystal. If the pretilt angle is equal to the molecular tilt in the Smectic C phase then a linear modulation of the transmitted light (grey scale) can be achieved. The grey scale capability of the cell in this example is illustrated in FIG. 10, wherein the y-axis shows the intensity of transmitted light in arbitrary units.

EXAMPLE 14

Induced Smectic C*

According to this Example 14, the cell gap is filled with a nematic liquid crystal possessing a negative dielectric anisotropy ($\Delta\epsilon<0$) and underlying Smectic C phase. A liquid crystal material with $\Delta\epsilon<0$ was chosen in order to stabilise the planar alignment of the liquid crystal molecules by means of dielectric coupling. The chiral molecules 20 that are attached to the inner surfaces 18 of the cell substrates 14 induce Smectic C* phase in the surface sub-regions 22. The induced Smectic C* phase is ferroelectric.

By the application of an external electrical field, the preferred direction of orientation of the molecules in the surface sub-region can be switched by direct coupling with the electrical field. The switching of the molecules in the surface sub-region is transferred, via elastic forces, to the molecules in the bulk of the liquid crystal.

EXAMPLE 15

Double-Sided Embodiment, Field Induced Twist

Figure 11:
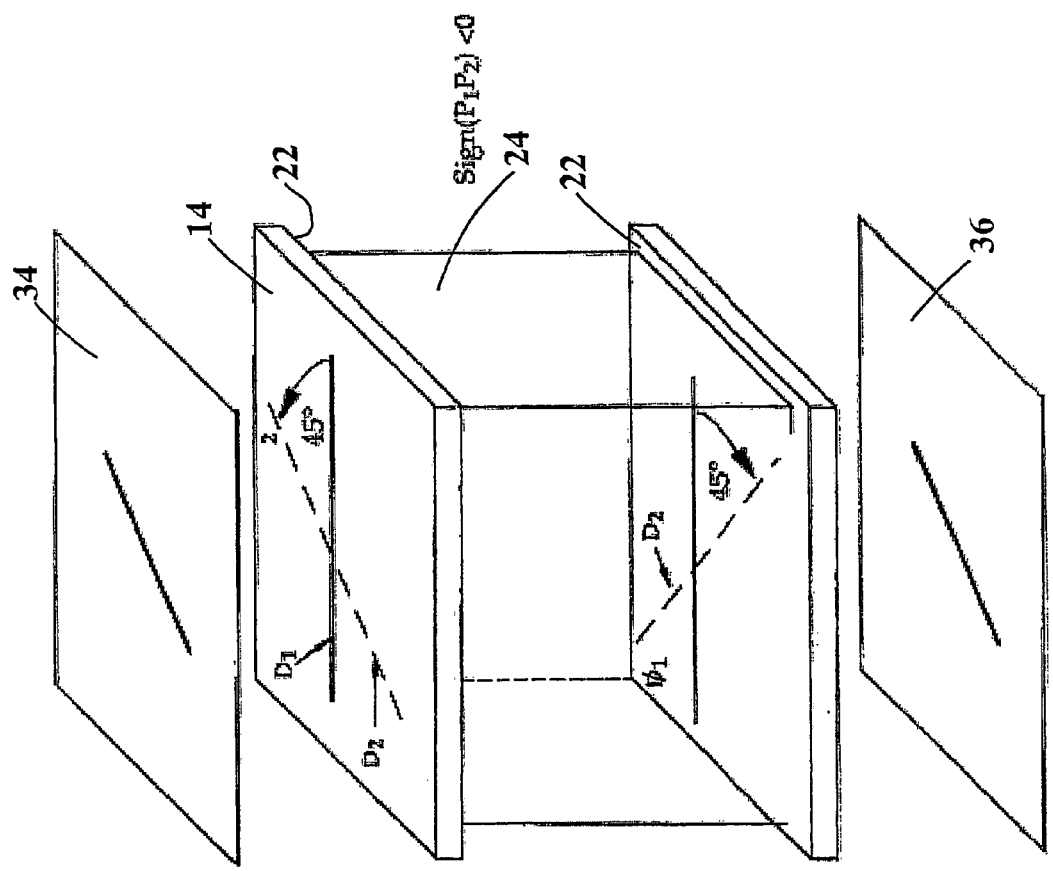
FIG. 11 schematically illustrates a double-sided embodiment of a liquid crystal device according to the invention with opposite signs of a induced spontaneous polarisation.

Reference is now made to FIG. 11, schematically illustrating an embodiment of a liquid crystal device according to the invention, wherein a first chiral surface induces Smectic C* phase in the associated surface sub-region 22 with a positive spontaneous polarisation (Ps>0), whereas a second chiral surface induces Smectic C* phase in the associated surface sub-region 22 with a negative spontaneous polarisation (Ps<0). The molecular tilt in both surface sub-regions 22 was in the order of 22.5 degrees.

The device in FIG. 11 was filled with a nematic liquid crystal material possessing a negative dielectric anisotropy ($\Delta\epsilon<0$) and underlying Smectic C phase. Thereafter the device was placed between parallel polarizers 34, 36 with its optic axis (at E=O) oriented at 45 degrees with respect to the transmission direction of the polarizers. On reversing the sign of an applied electric field, the device will be switched between a transmissive non-twisted state and a non-transmissive (dark) twisted state, due to the opposite signs of Ps in the two surface sub-regions 22.

EXAMPLE 16

Photo-Induced Ps Changes

According to Example 16, a device was prepared according to Example 14. In this case, however, the chiral layer deposited onto the one of the inner substrates surfaces is a mixture containing photosensitive molecules capable of changing the sign of the induced Ps in the surface sub-region upon light illumination.

It is also possible to provide a device where the chiral organic material covering both chiral surfaces is a mixture containing photosensitive molecules capable of changing the sign of the induced Ps in the surface sub-region under light illumination. The device may be filled with e.g. the achiral liquid crystal material Hoechst 908. The cell is illuminated with UV-light trough a mask. On applying an electric field, the cell optic axis in the illuminated area of the cell will switch in opposite direction than in the light protected cell area.

EXAMPLE 17

Selective Reflection

Figure 12:
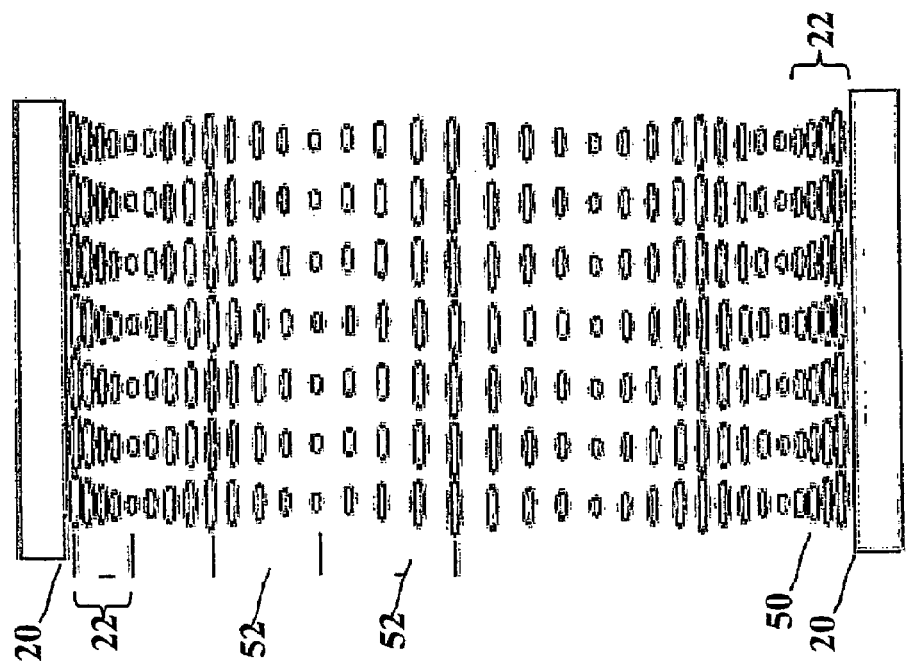
FIG. 12 schematically illustrates an embodiment of the invention presenting a gradient pitch.

Reference is now made to FIG. 12. In this case, the chiral material 20 is chosen to have high twisting power. The device was filled with the nematic liquid crystal mixture E7 (Merck) exhibiting Δε>0. The two chiral surfaces induce in the associated surface sub-regions 22 a helical molecular order with very short pitch, as illustrated at reference numeral 50. This helical order penetrate in the bulk 24 of the liquid crystal material 12 increasing continuously the pitch length on moving away from the substrate as illustrated at reference numeral 52.

Thus, in the cell there will be a helical molecular order with presenting a gradient pitch. By using this principle or effect, it will be possible to achieve a selective reflection of the incident light in a very broad spectrum. With a proper choice of chiral material and cell gap, it will be possible to obtain efficient selective reflection of white light from the device and therefore it will appear white in colour.

Figure 13A:
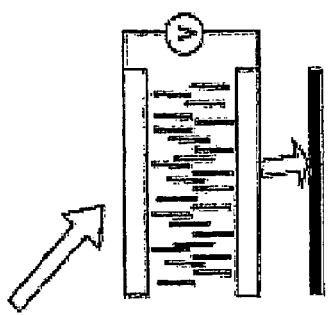
FIG. 13 schematically illustrates the operation of the embodiment in FIG. 12.
Figure 13B:
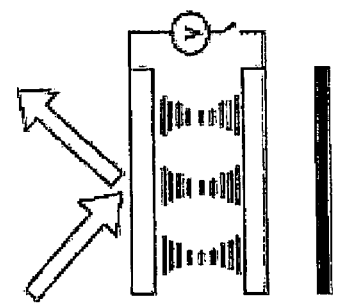

Now, placing the device on absorbing light black coloured background, the black background will be not visible through the cell. Further, applying an electric field across the cell will orient the liquid crystal molecules along the field, i.e. perpendicular to the substrates 14, and the cell will become transparent and the black background visible. Thus, in "field-on state" the cell will appears black whereas in "field-off state" it will be white, as schematically illustrated in FIGS. 13A and 13B, which illustrate selective reflection of light and absorption of light, respectively.

The invention claimed is:

1. A liquid crystal device, comprising a liquid crystal bulk layer (10) and chiral dopants (20) being inhomogeneously distributed in the bulk layer (10) as a result of being permanently attached to at least one surface, termed chiral surface, thereby inducing a local variation of one or more chirality-related physical properties within a sub-volume (22) of the bulk layer (10) adjacent said chiral surface, said chiral dopants (20) being soluble in the liquid crystal bulk layer (10).

2. A device as claimed in claim 1, wherein said chiral dopants (20) are inducing a local increase of one or more chirality-related physical properties within a sub-volume (22) of the bulk layer (10) adjacent said chiral surface, causing the appearance of a spontaneous polarisation having a non-homogenous distribution, being maximum at said chiral surface and dropping in a direction away from said chiral surface (18).

3. A device as claimed claim 1, wherein the response of the bulk layer (10), within said sub-volume (22), to an electrical field (E) applied over the bulk layer (10) is one of ferroelectric, antiferroelectric, flexoelectric and paraelectric or any combination thereof.

4. A device as claimed claim 1, wherein the non-doped bulk layer (10) presents an electrical field response that is one of ferroelectric, antiferroelectric, flexoelectric and paraelectric, and wherein the dopants (20) are selected to enhance such an electrical field response.

5. A device as claimed in claim 1, further comprising two substrates (14) confining therebetween said liquid crystal bulk layer (10), said chiral surface (18) being located on one of said substrates (14).

6. A device as claimed in claim 1, wherein the chiral surface is located inside the bulk layer (10).

7. A device as claimed in claim 1, wherein said liquid crystal bulk layer (10) comprises an achiral liquid crystal material.

8. A device as claimed in claim 7, wherein the liquid crystal bulk layer (10) comprises an achiral nematic liquid crystal material.

9. A device as claimed in claim 7, wherein the liquid crystal bulk layer (10) comprises an achiral smectic liquid crystal material.

10. A device as claimed in claim 1, wherein said bulk layer (10) comprises a chiral liquid crystal material.

11. A device as claimed in claim 1, wherein said chiral dopants (20) comprises photosensitive molecules.

12. A device as claimed in claim 1, wherein said chiral dopants (20) are produced from at least one of a polymer material, an oligomer material and a monomer material.

13. A device as claimed in claim 1, wherein the dopants (20) comprise an organic material.

14. A device as claimed in claim 1, wherein the dopants (20) comprise a material that does not present liquid crystal properties.

15. A device as claimed in claim 1, wherein the dopants (20) comprise a material that presents liquid crystal properties.

16. A device as claimed in claim 1, wherein the chiral dopants (20) are chemically attached to said surface (18).

17. A device as claimed in claim 1, wherein the bulk layer (10) presents a surface director having a preferred orientation that is substantially parallel to or tilted in relation to said chiral surface (18).

18. A device as claimed claim 1, wherein the bulk layer (10) comprises such a liquid crystal material that switching of a surface director of the non-doped bulk material is not directly controllable by an electric field.

19. A device as claimed in claim 1, further comprising a separate alignment layer (32) arranged to provide a preferred molecule orientation at said chiral surface (18).

20. A device as claimed in claim 19, wherein said separate alignment layer (32) is a non-dynamic alignment layer (32).

21. A device as claimed in claim 20, wherein the chiral dopants (20) are chemically attached to said non-dynamic alignment layer (32).

22. A device as claimed in claim 1, wherein the bulk layer (10) comprises a nematic liquid crystal material having a twisted configuration of a nematic director within said bulk layer (10).

23. A device as claimed in claim 1, wherein the bulk layer (10) comprises a nematic liquid crystal material having a non-twisted configuration of a nematic director within said bulk layer (10).

24. A device as claimed in claim 1, wherein the bulk layer (10) comprises a smectic liquid crystal material having a twisted configuration of a nematic director within said bulk layer (10).

25. A device as claimed in claim 1, wherein the bulk layer (10) comprises a smectic liquid crystal material having a non-twisted configuration of a nematic director within said bulk layer (10).

26. A device as claimed in claim 1, wherein the bulk layer (10) comprises a discotic liquid crystals material.

27. A device as claimed in claim 1, wherein the bulk layer (10) is confined between said chiral surface (18), which is arranged on a first side of the bulk layer (10), and a non-dynamic surface alignment layer (32) arranged on an opposite side of the bulk layer (10).

28. A device as claimed in claim 1, further comprising, in addition to the first-mentioned chiral surface (18), termed first chiral surface (18), a second chiral surface (18) also having chiral dopants (20) permanently attached thereto, said bulk layer (10) being confined between said first and second chiral surfaces (18).

29. A device as claimed in claim 28, further comprising two substrates confining there between said liquid crystal bulk layer, said first chiral surface being located on one of said substrates and said second chiral surface being located on the other of said substrates.

30. A device as claimed in claim 28, wherein said first and second chiral surfaces (18) are inducing spontaneous polarisation of opposite sign (Ps>0 and Ps<0).

31. A device as claimed in claim 28, wherein the first chiral surface (18) comprises a chiral material presenting a first handedness, and the second chiral surface (18) comprises a chiral material presenting a second, different handedness.

32. A device as claimed in claim 28, wherein the first and second chiral surfaces (18) are made of chiral materials presenting different twisting powers.

33. A device according to claim 1, further comprising means (34, 36) arranged to transform a directional switch of a director within the bulk layer (10) into an optically visible effect.

* * * * *